(12) United States Patent
Yao et al.

(10) Patent No.: US 10,654,977 B2
(45) Date of Patent: May 19, 2020

(54) UNDERWATER SELF-HEALABLE MATERIALS, METHODS OF MAKING THEREOF, AND PRODUCTS COMPRISING SAME

(71) Applicant: City University of Hong Kong, Hong Kong (HK)

(72) Inventors: Xi Yao, Hong Kong (HK); Meijin Liu, Hong Kong (HK)

(73) Assignee: CITY UNIVERSITY OF HONG KONG, Kowloon Tong (HK)

( * ) Notice: Subject to any disclaimer, the term of this patent is extended or adjusted under 35 U.S.C. 154(b) by 190 days.

(21) Appl. No.: 15/886,016

(22) Filed: Feb. 1, 2018

(65) Prior Publication Data

US 2019/0233592 A1    Aug. 1, 2019

(51) Int. Cl.
*C08G 77/388* (2006.01)
*C08J 3/24* (2006.01)
(Continued)

(52) U.S. Cl.
CPC .......... *C08G 77/388* (2013.01); *C07F 7/0838* (2013.01); *C07F 7/0889* (2013.01);
(Continued)

(58) Field of Classification Search
None
See application file for complete search history.

(56) References Cited

U.S. PATENT DOCUMENTS 6,320,018 B1 * 11/2001 Sijbesma ............. C07D 239/47
                                                         528/172
7,723,405 B2    5/2010 Braun et al.
(Continued)

FOREIGN PATENT DOCUMENTS

CN        105017779 A    11/2015
NL          2006669 C    11/2012

OTHER PUBLICATIONS

Gemert et al. "Self-Healing Supramolecular Polymers in Action" Macromolecular Chemistry and Physics, 2012, 213, 234-242. (Year: 2012).*

(Continued)

*Primary Examiner* — Robert S Loewe
(74) *Attorney, Agent, or Firm* — Melvin Li; Heslin, Rothenberg Farley & Mesiti PC

(57) ABSTRACT

The present invention has provided a self-healable material configured to self-heal in the presence of moisture or in aqueous condition environment after physical damages. The material includes or made from a compound of formula IV

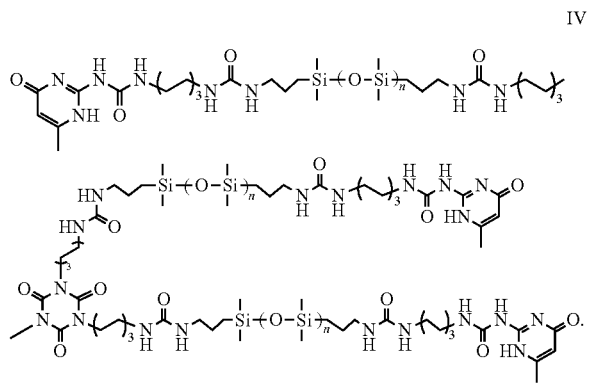

4 Claims, 25 Drawing Sheets
(19 of 25 Drawing Sheet(s) Filed in Color)

(51) Int. Cl.
*C07F 7/08* (2006.01)
*C08G 77/00* (2006.01)

(52) U.S. Cl.
CPC ............... *C08J 3/24* (2013.01); *C08G 77/70* (2013.01); *C08J 2383/08* (2013.01)

(56) References Cited

U.S. PATENT DOCUMENTS

| | | | |
|---|---|---|---|
| 8,247,524 | B2 | 8/2012 | Janssen et al. |
| 2003/0092838 | A1* | 5/2003 | Fomperie ............... C08L 83/08 525/71 |
| 2004/0161394 | A1* | 8/2004 | Mougin .................. A61K 8/85 424/70.11 |
| 2006/0018856 | A1* | 1/2006 | Bosman ............... A61K 8/0229 424/70.12 |
| 2010/0076147 | A1 | 3/2010 | Hoorne-Van Gemert et al. |
| 2013/0195778 | A1* | 8/2013 | Chodorowski-Kimmes ................ A61K 8/8194 424/59 |

OTHER PUBLICATIONS

Liu et al. "Synthesis and properties of UV-curable self-healing oligomer" Progress in Organic Coatings, 2016, 101, 122-129. (Year: 2016).*
Brunsveld, L., et al., "Supramolecular polymers", Chem. Rev. 101, 4071-4098 (2001).
Rowan, S. J., et al., "Dynamic covalent chemistry", Angew. Chem. Int. Ed. 41, 898-952 (2002).
Aida, T., et al., "Functional supramolecular polymers", Science 335, 813-817 (2012).
Yang, L., et al., "Supramolecular polymers: historical development, preparation, characterization, and functions", Chem. Rev. 115, 7196-7239 (2015).
Burnworth, M., et al., "Optically healable supramolecular polymers", Nature 472, 334-337 (2011).
Yan, X., et al., "Stimuli-responsive supramolecular polymeric materials", Chem. Soc. Rev. 41, 6042-6065 (2012).
Appel, E. A., et al., "Supramolecular polymeric hydrogels", Chem. Soc. Rev. 41, 6195-6214 (2012).
Balkenende, D.W., et al., "Optically responsive supramolecular polymer glasses", Nat. Commun. 7, 10995 (2016).
Filippidi, E. et al., "Toughening elastomers using mussel-inspired iron-catechol complexes", Science 358, 502-505 (2017).
Nishimura, Y., et al., "Silyl ether as a robust and thermally stable dynamic covalent motif for malleable polymer design", J. Am. Chem. Soc. 139, 14881-14884 (2017).
Wang, Q., et al., "High-water-content mouldable hydrogels by mixing clay and a dendritic molecular binder", Nature 463, 339-343 (2010).
Heinzmann, C., et al., "Supramolecular polymer adhesives: advanced materials inspired by nature", Chem. Soc. Rev. 45, 342-358 (2016).
Zhang Y. et al., "Malleable and recyclable poly(urea-urethane) thermosets bearing hindered urea bonds", Adv. Mater. 28, 7646-7651 (2016).
Cordier, P., et al., "Self-healing and thermoreversible rubber from supramolecular assembly", Nature 451, 977-980 (2008).
Ying, H., et al., "Dynamic urea bond for the design of reversible and self-healing polymers", Nat. Commun. 5, 3218 (2014).
Cromwell, O.R., et al., "Malleable and self-healing covalent polymer networks through tunable dynamic boronic ester bonds", J. Am. Chem. Soc. 137, 6492-6495 (2015).
Li, C.H., et al., "A highly stretchable autonomous self-healing elastomer", Nat. Chem. 8, 618-624 (2016).
Montarnal, D., et al., "Versatile one-pot synthesis of supramolecular plastics and self-healing rubbers", J. Am. Chem. Soc. 131, 7966-7967 (2009).
Chen, Y., et al., "Multiphase design of autonomic self-healing thermoplastic elastomers", Nat. Chem. 4, 467-472 (2012).
Korolkov, V.V., et al., "Supramolecular heterostructures formed by sequential epitaxial deposition of two-dimensional hydrogen-bonded arrays", Nat. Chem., doi:10.1038/nchem.2824 (2017).
Shi, Q., et al., "Stimuli-controlled self-assembly of diverse tubular aggregates from one single small monomer", Nat. Commun. 8, 14943 (2017).
Krieg, E., et al., "Supramolecular polymers in aqueous media", Chem. Rev. 116, 2414-2477 (2016).
Ahn, B.K., et al., "Surface-initiated self-healing of polymers in aqueous media", Nat. Mater. 13, 867-872 (2014).
Burzio, L.A., "Cross-linking in adhesive quinoproteins: studies with model decapeptides", Biochemistry 39, 11147-11153 (2000).
Lee, H., et al., "Single-molecule mechanics of mussel adhesion", Proc. Natl. Acad. Sci. U.S.A. 103, 12999-13003 (2006).
Holten-Andersen, N., et al., "pH-inducedmetal-ligand cross-links inspired by mussel yield self-healing polymer networks with near-covalent elasticmoduli", Proc. Natl. Acad. Sci. U.S.A. 108, 2651-2655 (2011).
Shafiq, Z., et al., "Bioinspired underwater bonding and debonding on demand", Angew. Chem. Int. Ed. 51, 4332-4335 (2012).
Sedo, J., et al., "Catechol-based biomimetic functional materials", Adv. Mater. 25, 653-701 (2013).
Ky Hirschberg, J.H.K., et al., "Helical self-assembled polymers from cooperative stacking of hydrogen-bonded pairs", Nature 407, 167-170 (2000).
Obert, E., et al., "Both water- and organo-soluble supramolecular polymer stabilized by hydrogen-bonding and hydrophobic interactions", J. Am. Chem. Soc. 129, 15601-15605 (2007).
Kushner, A.M., et al., "A biomimetic modular polymer with tough and adaptive properties", J. Am. Chem. Soc. 131, 8766-8768 (2009).
Phadke, A., et al., "Rapid self-healing hydrogels", Proc. Natl. Acad. Sci. U.S.A. 109, 4383-4388 (2012).
Guo, M., et al., "Tough stimuli-responsive supramolecular hydrogels with hydrogen-bonding network junctions", J. Am. Chem. Soc. 136, 6969-6977 (2014).
Sijbesma, R.P., et al., "Reversible polymers formed from self-complementary monomers using quadruple hydrogen bonding", Science 278, 1601-1604 (1997).
Hentschel, J., et al., "Self-healing supramolecular block copolymers", Angew. Chem. Int. Ed. 51, 10561-10565 (2012).
Zha, R.H., et al., "End groups of functionalized siloxane oligomers direct block-copolymeric or liquid-crystalline self- assembly behavior", J. Am. Chem. Soc. 138, 5693-5698 (2016).
Barland, P., et al., "Negative staining with osmium tetroxide vapour", Nature 212, 84-85 (1966).
Genabeek, B.V., et al., "Amplifying (im)perfection: the impact of crystallinity in discrete and disperse block co-oligomers", J. Am. Chem. Soc. 139, 14869-14872 (2017).
Dong, S., et al., "Structural water as an essential comonomer in supramolecular polymerization", Sci. Adv. 3, eaao0900 (2017).
Ma, M., et al., "Bio-inspired polymer composite actuator and generator driven by water gradients", Science 339, 186-189 (2013).
Lee, J.N., et al., "Solvent compatibility of poly(dimethylsiloxane)-based microfluidic devices", Anal. Chem. 75, 6544-6554 (2003).
Brunsveld, L., et al., "Hierarchical formation of helical supramolecular polymers via stacking of hydrogen-bonded pairs in water", Proc. Natl. Acad. Sci. U.S.A. 99, 4977-4982 (2002).
Lortie, F., et al., "N'-disubstituted ureas: influence of substituents on the formation of supramolecular polymers", Chem. Eur. J. 9, 3008-3014 (2003).
Li, J., et al., "Shape-memory effects in polymer networks containing reversibly associating side-groups", Adv. Mater. 19, 2851-2855 (2007).
Zhang, G., et al., "Unusual aspects of supramolecular networks: plasticity to elasticity, ultrasoft shape memory, and dynamic mechanical properties", Adv. Funct. Mater 26, 931-937 (2016).
Sollich, P., "Rheological constitutive equation for a model of soft glassy materials", Phys. Rev. E 58, 738-759 (1998).
Folmer, B.J.B., et al., "Supramolecular polymer materials: chain extension of telechelic polymers using a reactive hydrogen-bonding synthon", Adv. Mater. 12, 874-878 (2000).

(56) References Cited

OTHER PUBLICATIONS

"Self-Healing Materials Market | Global Forecast to 2021" (www.marketsandmarkets.com/search.asp?Search=Self%2DHealing+Materials&x=0&y=0&offset=0) Report Code CH 5063, Markets and Markets, Mar. 2017, 27 pgs.

"Markets for Self Healing Materials: 2017-2024", Report # Nano-891, n-tech Research, Jan. 9, 2017, 9 pgs.

* cited by examiner

UNDERWATER SELF-HEALABLE MATERIALS, METHODS OF MAKING THEREOF, AND PRODUCTS COMPRISING SAME

FIELD OF THE INVENTION

The present invention is concerned with a self-healable material configured to self-heal in the presence of moisture or in aqueous condition after physical damages, intermediate ingredients for making of such a material, methods of making such intermediate ingredients, and products comprising such a self-healable material.

BACKGROUND OF THE INVENTION

There has been proposals of materials which are able to "self-heal" after physical breakage. By "self-heal", it refers to the ability of being able to resume the original form after the breakage. However, most if not all such conventional materials are not able to perform the self-healing function in a moist environment or under water. This is due to, for example, hydrogen-bonded supramolecular polymers generally can rarely heal themselves in water because water is a strong competitor for hydrogen bonding and the hydration of the hydrogen bonding motifs would inhibit intermolecular hydrogen bonding and material healing.

As such, inventors of the present invention have perceived that it would be highly desirable to develop polymeric materials that are self-healable after mechanical damages, especially for these materials serving in wet or aqueous environments.

The present invention seeks to address these issues, or at least to provide an alternative to the public.

SUMMARY OF THE INVENTION

According to a first aspect of the present invention, there is provided an intermediate compound of formula I, for use in manufacture of a self-healable

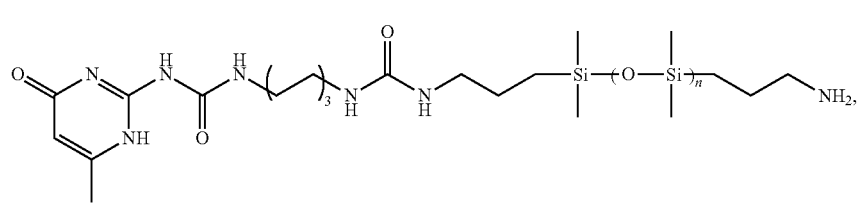

wherein n is from 4 to 24. With n in the range, the molecular weight would range from about 2000 to 300. This range is advantageous in balancing self-healing performance and healing time of the self-healable material made from the intermediate. If n is beyond 24, the self-healing property would be suppressed. The compound of formula I may have chemical name of 1-(2-(3-(3-(3-(3-aminopropyl)-1,1,3,3-tetramethyldisiloxanyl)propyl)ureido)ethyl)-3-(6-methyl-4-oxo-1,4-dihydropyrimidin-2-yl)urea. The HMDI, which provides the urea-$(CH_2)_6$-urea motif, may be replaced by other di-isocynates, including Tolylene-2,4-diisocyanate, lsophorone diisocyanate, 4,4'-Methylenebis(phenyl isocyanate), 1,4-Diisocyanatobutane, 1,8-Diisocyanatooctane.

According to a second aspect of the present invention, there is provided with a method of making the compound of formula I, comprising a step of reacting a compound of formula II

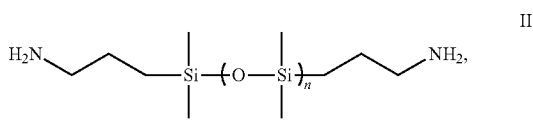

with a compound of formula III

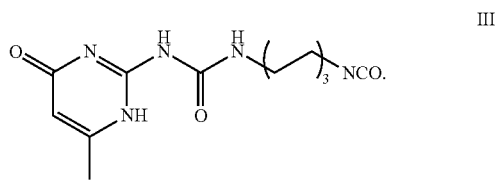

The compound of formula II may have a chemical name of 3,3'-(1,1,3,3-tetramethyldisiloxane-1,3-diyl)bis(propan-1-amine). The compound of formula III may have a chemical name of 1-(2-isocyanatoethyl)-3-(6-methyl-4-oxo-1,4-dihydropyrimidin-2-yl)urea.

According to a third aspect of the present invention, there is provided a self-healable material configured to self-heal in the presence of moisture or in aqueous condition environment after physical damages, comprising a compound of formula IV

IV

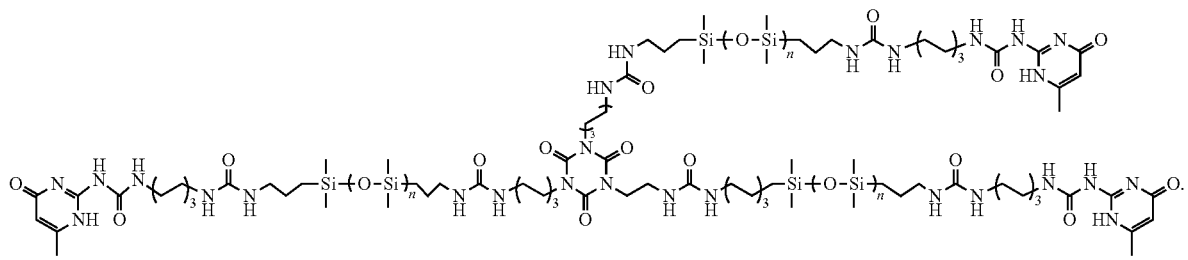

According to a fourth aspect of the present invention, there is provided a method of making of a self-healable material as described above, comprising a step of reacting the compound of formula I with a compound of formula V

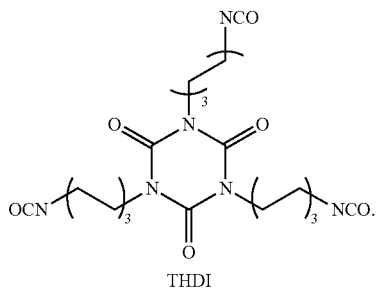

THDI

The compound of formula V may have a chemical name of 1,3,5-tris(2-isocyanatoethyl)-1,3,5-triazinane-2,4,6-trione.

According to a fifth aspect of the present invention, there is provided an adhesive comprising a self-healable compound as described above.

According to a sixth aspect of the present invention, there is provided a coating comprising a self-healable compound as described above, for use in, for example, as a protective coating. Please see for example FIG. 23 which shows applications of the present invention.

BRIEF DESCRIPTION OF THE DRAWINGS

The patent of application file contains at least one drawing executed in color. Copies of this patent or patent application publication with color drawing(s) will be provided by the Office upon request and payment of the necessary fee.

Some embodiments of the present invention will now be explained, with reference to the accompanied drawings, in which:—

FIGS. 3a to 3f are images from AFM scanning of sectioned films of the (UPDMS)$_3$THDI, in which FIGS. 3a, 3c and 3e are AFM topography images with increased magnification, FIGS. 3b, 3d and 3f are AFM modulus images;

FIGS. 14a to 14d are schematic diagrams and graphs showing investigation of UPy dimer association/disassociation via spectroscopy methods, in which FIG. 14a illustrates a structure of quadruple hydrogen bonded UPy dimer, FIG. 14b is a structure of completely disassociated UPy dimer, FIG. 14c is a graph showing temperature depended UV-Vis spectroscopy of the (UPDMS)$_3$THDI films underwater with the spectroscopy in air at 20° C. for control, and FIG. 14d is a graph showing ATR-IR spectra of (UPDMS)$_3$THDI films in air and underwater at 20° C. and 70° C.;

FIGS. 17a and 17b are graphs showing the results from the rheological test of (UPDMS)$_3$THDI, in which FIG. 17a illustrates the relationship of loss modulus (G") and storage modulus (G') versus frequency at 70° C. air, and FIG. 17b illustrates the relationship of viscosity versus temperature at a heating rate of 10° C.·min$^{-1}$;

FIGS. 20a to 20i illustrate healing properties of (UPDMS)$_3$ THDI films, in which FIG. 20a is an optical microscopic image of a damaged film in air, FIG. 20b is an optical microscope image of the film after healing in air (70° C.) for 12 h, FIG. 20c is a confocal microscope image on the healed region of the sample (stained with Nile red), FIG. 20d is an optical microscopic image of a damaged film underwater, FIG. 20e is an optical microscope image of the film after healing underwater (70° C.) for 5 min, FIG. 20f is a confocal microscope image on the healed region of the sample (stained with Nile red), FIG. 20g is a graph showing tensile stress-strain curves of healed (UPDMS)$_3$THDI films in different conditions, FIG. 20g is a graph showing films healed in air for 12 h at different temperatures, FIG. 20h is a graph showing films healed at 90% RH for 12 h with different temperatures, and FIG. 20i is a graph showing films healed underwater for 12 h at various temperatures except 70° C., for which the healing time is 5 min;

FIGS. 21a to 21i are schematics diagrams and graphs showing the measuring of adhesion force and modulus of (UPDMS)$_3$THDI films using AFM, in which FIGS. 21a to 21c are schematic illustration of measuring adhesion force and modulus in different conditions. They were measured by approaching the tip to the (UPDMS)$_3$THDI films and then retracting the tip, FIGS. 21d to 21f are graphs showing Distribution of modulus (UPDMS)$_3$THDI films measured via bare AFM tip in conditions of 20° C. air, 40° C. air and 20° C. underwater, respectively. Insets: corresponding AFM modulus images (500 nm×500 nm), and FIGS. 21g to 21i are graphs showing distribution of adhesion forces measured between the bare AFM tip and (UPDMS)$_3$THDI films in conditions of 20° C. air, 40° C. air and 25° C. underwater, respectively. Insets: corresponding AFM adhesion force images (500 nm×500 nm);

FIG. 22d is a graph showing quantitative shape memory cycles for (UPDMS)$_3$THDI films at 70° C., FIG. 22e is a graph showing quantitative shape memory cycles for (UPDMS)$_3$THDI films at 80° C., and FIG. 22f are images showing demonstrating shape memory performance of the healed (UPDMS)$_3$THDI structure.

DETAILED DESCRIPTION OF PREFERRED EMBODIMENTS OF THE INVENTION

Figure 1A:
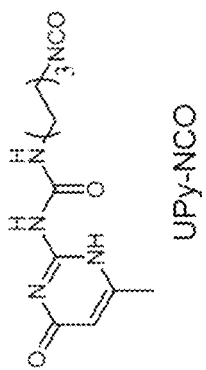
FIGS. 1a to 1c illustrate an embodiment of a three-step synthesis of a compound with under water self-healable property ((UPDMS)$_3$THDI) according to the present invention.
Figure 1A:
Figure 1A:
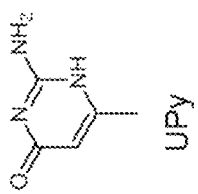
Figure 1B:
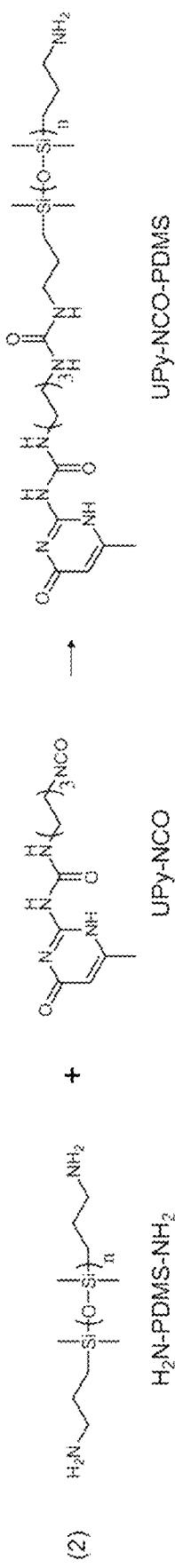
Figure 1C:
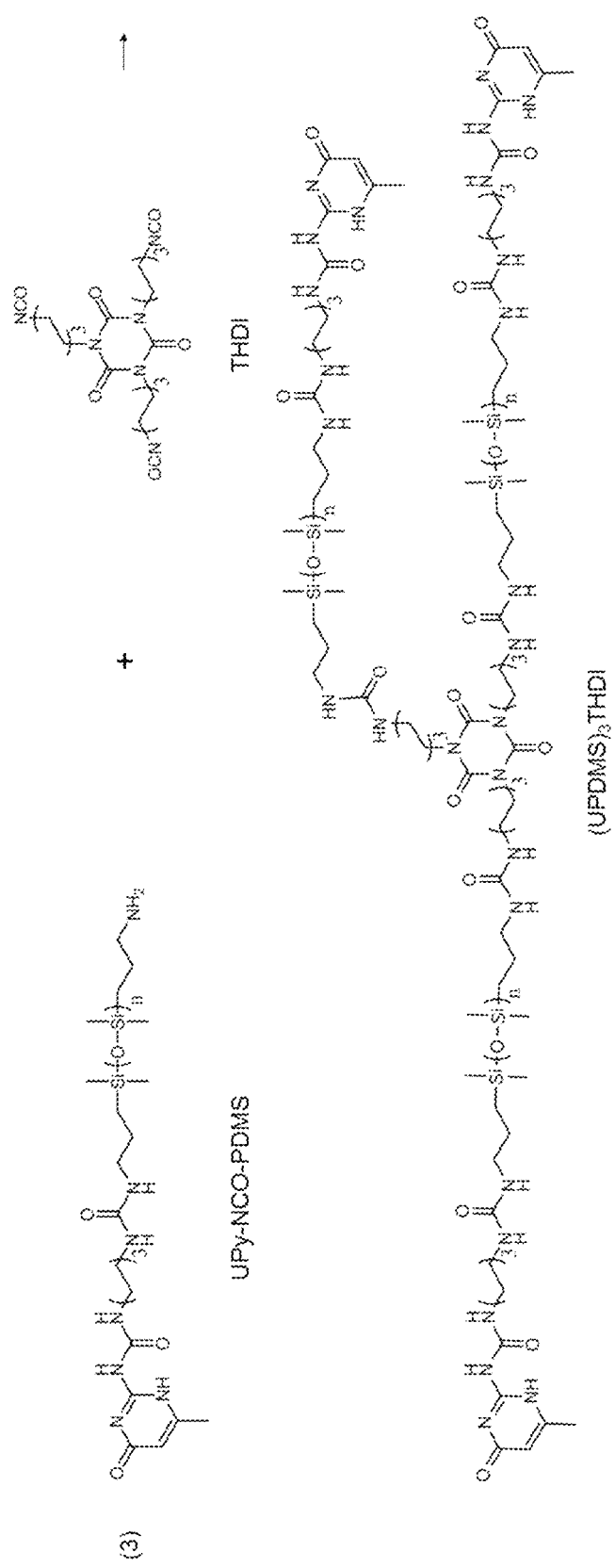

Supramolecular polymers assembled from low-molecular-weight monomeric blocks or oligomers through dynamic and reversible interactions usually exhibit stimuli-responsiveness and interesting mechanical properties, such as malleability, processability, recyclability and self-healing. Hydrogen bonding assisted assembly and crosslinking are amongst the most interesting assembly unit due to its directionality, tunable binding dynamics and broad selection of building motifs. However, the recognition between hydrogen bonding motifs becomes less efficient in moisture or aqueous conditions because water is a strong competitor for hydrogen bonding, which constrains the performance of those hydrogen-bonded supramolecular polymers. For example, many hydrogen-bonded supramolecular polymers are not self-healable in wet conditions, because water molecules will bind to hydrogen bonding motifs exposed at the damaged interface and thus prevent interfacial recovery and material healing. There are a few underwater self-healable polymers, which utilize catechol-mediated hydrogen-bonding for adhesion and self-healing in aqueous conditions. The extensive interfacial catechol motifs were constructed to form strong surface-initiated intermolecular hydrogen bonds, but their wide application is precluded by the ease of oxidation of catechol motifs as well as the highly competitive coordination between catechol with metal cations.

Attempts were made to address these issues by constructing hydrophobic compartmentalization to shield and protect hydrogen bonds from the aqueous environment. However, conventional hydrogen-bonded polymers constructed from such design strategy do not exhibit consistent performance on underwater self-healing, and the balance between hydrophobic microenvironment. Despite substantial efforts, hydrogen-bonded polymeric materials capable of underwater self-healing, taking advantage of stimuli-responsiveness, and offering modulable mechanics had remained a highly desired but elusive goal.

The present invention is concerned with an underwater self-healable supramolecular elastomer through hydrogen-bond assisted multiphase assembly of three-arm siloxane oligomers. By "underwater", it refers to the condition when immersed under water or in a moist environment. The elastomer includes oligomers bond together through multivalent hydrogen bonding, and the oligomers are assembled into a microphase-separated system. The elastomer is unique due to water-permeability of the hydrophobic siloxane microenvironment which allows travelling of water molecules in the elastomer to facilitate reversible dissociation and formation of intermolecular hydrogen bonding but at the same time inhibits violent hydration of the hydrogen bonding motifs, resulting in reliable underwater self-healing, shape memory and other water-regulated mechanic properties of the elastomers.

Specifically, the present invention has provided a strategy on the hydrogen bonding assisted multiphase-assembly of siloxane oligomers which takes advantages of microphase separated hard crystalline domains and surrounding water-permeable soft hydrophobic siloxane domains in regulating the water penetration and retention in each phases and modulates the molecular and structural integrity of the hydrogen-bonded building blocks to achieve high strength, underwater self-healing and shape-memory properties that are rarely achieved on hydrogen-bonded supramolecular polymers. Unlike other hydrogen-bonded supramolecular polymers which could not perform full function in aqueous conditions, in the present invention water plays a key role in modulating mechanical properties of the developed materials. Advantageously, the present invention, by designing the chemical environment of the hydrogen bonding motifs, has enabled water molecules to travel through the polymer network to help dissociation of the hydrogen bonding, while the violent water retention inside the whole material is strictly limited to prevent hydration of the hydrogen bonding motifs and thus secure the reversible formation of the hydrogen bonding, synergizing the mechanical stability and underwater self-healing.

The following depicts experiments leading to the present invention.

Results and Discussion

Figure 2:
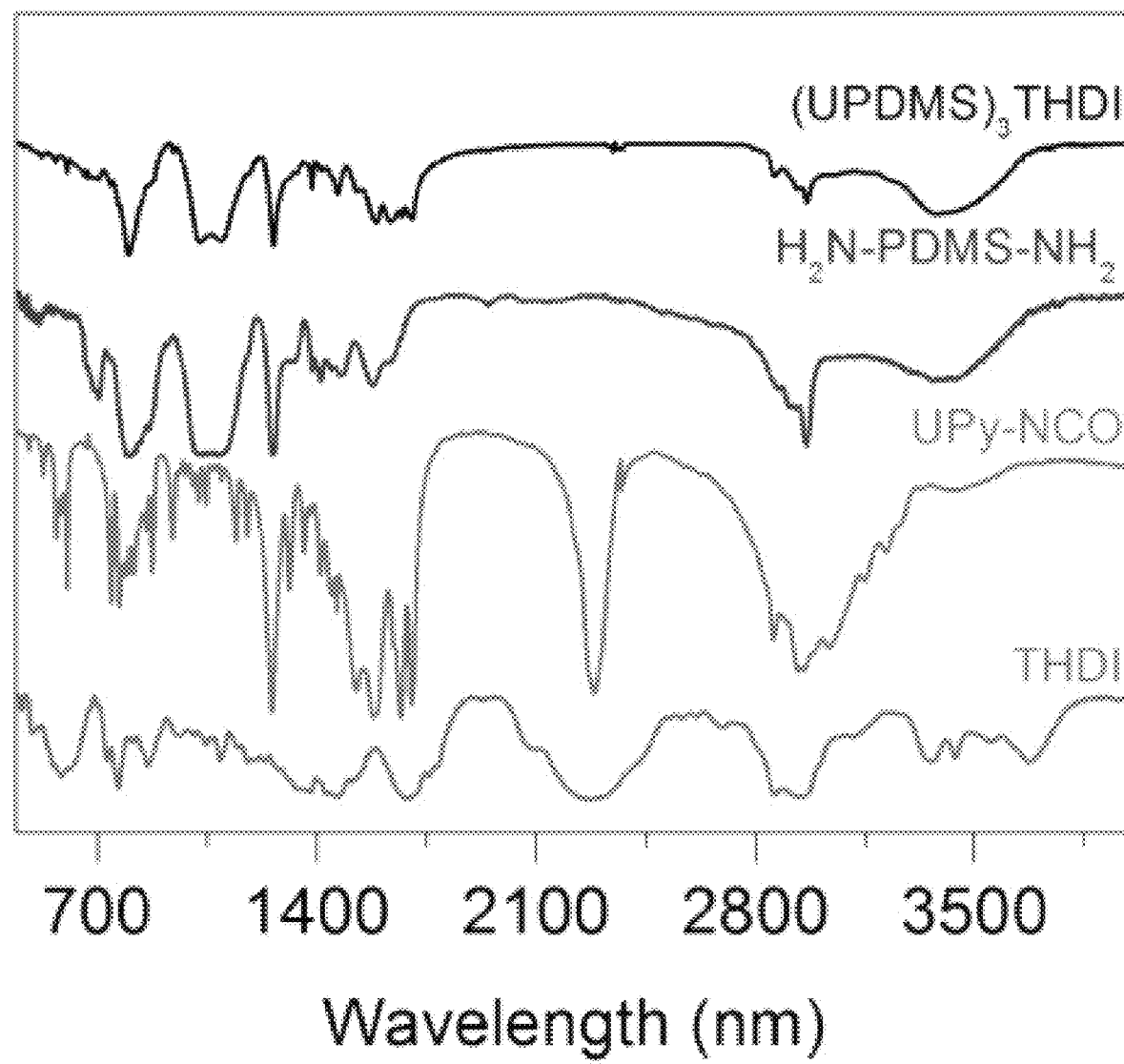
FIG. 2 is a FTIR spectrum for the (UPDMS)$_3$THDI.
Figures 3A, 3B, 3C, 3D, 3E, 3F:
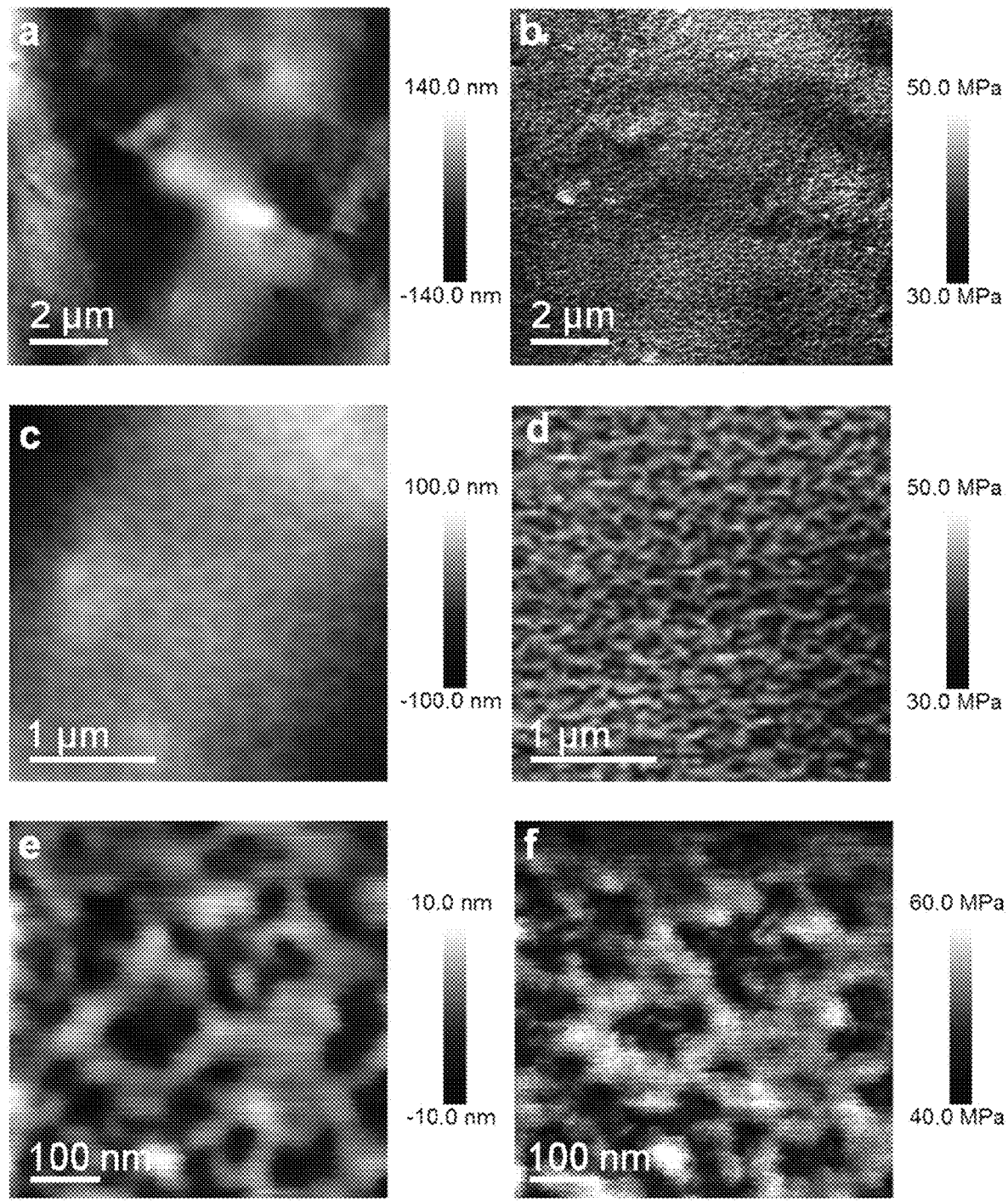

Material design and characterization. To build the oligomer for hydrogen bonding assisted self-assembly, ureidopyrimidinone (UPy), a multivalent hydrogen bonding motif, was selected. The UPy is incorporated with shortchain poly(dimethylsiloxane) (PDMS) followed by the reaction with a tri-functional molecule hexamethylene diisocyanate (THDI) to form a three-arm oligomer $(UPDMS)_3THDI$ for self-assembly. Please see FIGS. 1a to 2. The UPy motifs can form dimers via quadruple hydrogen-bonding, and the three-arm oligomers can form a three dimensional (3D) network through the connection of UPy dimers. During the assembly process, the UPy dimers further assembled into larger stacks with high crystallinity[36], and the hard UPy stacks phase-separate from the soft and hydrophobic PDMS blocks, resulting in a microphase-separated, semi-crystalline supramolecular elastomer.

The UPy-riched crystalline domains enhance mechanical strength of the elastomer and provide dynamic bonds, similar to other UPy-functionalized polymers, while the soft PDMS domains offer elastomeric properties and facilitate the elastomer to achieve underwater self-healing. The PDMS domains are gas permeable, allowing water molecules to slowly penetrate the whole sample and to regulate the dissociation of UPy dimers and stacks. Moreover, the PDMS domains confine an apolar and hydrophobic environment that would not be affected by water and thus localize the UPy-riched microphases during the water assisted dissociation process. Therefore, the elastomer could maintain the molecular and structural integrity but perform reliable self-healing in aqueous environments. Please see FIG. 19a.

Figures 4A, 4B:
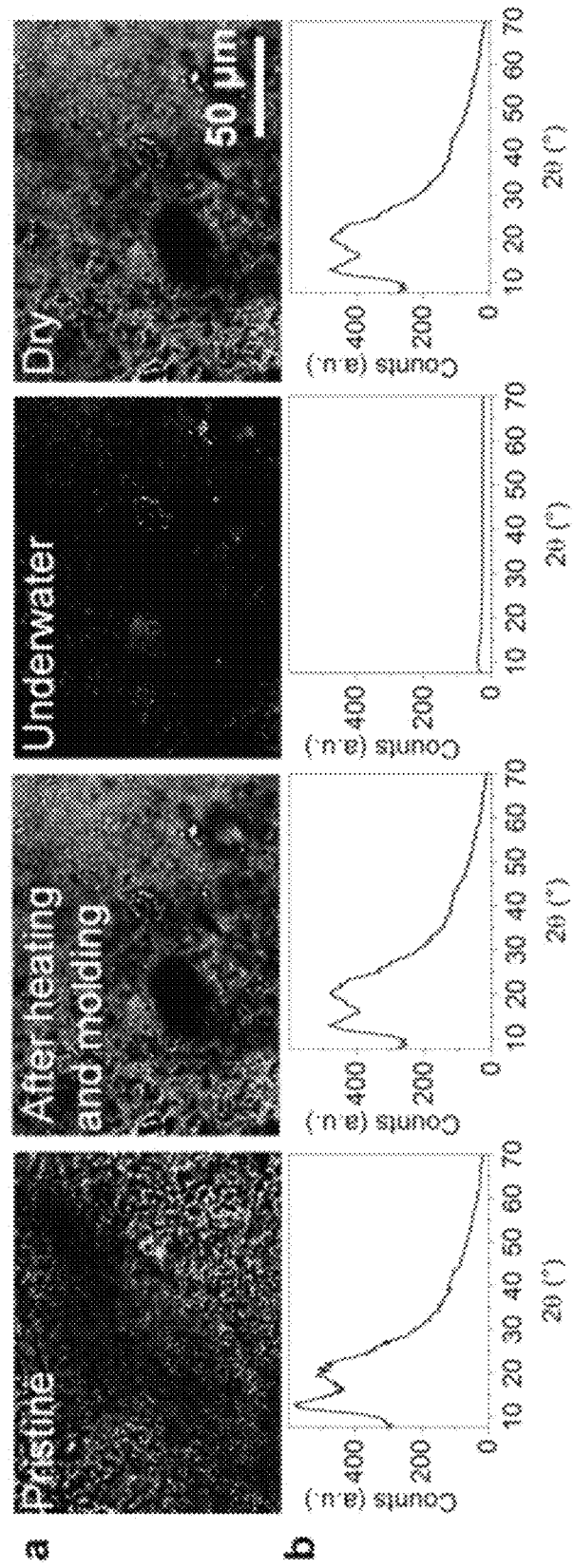
FIG. 4a is POM imaging of the as-prepared polymer film sample (i.e. sample after being heated to 175° C. for 5 min and cooled down to room temperature, sample underwater, and sample after drying, and FIG. 4b is the corresponding powder X-ray diffraction spectra of the sample with different treatments.

To verify the self-assembly and microphase separation of the elastomer, samples of sectioned films with 30 nm~300 μm thickness were characterized by atomic force microscope (AFM) and transmission electron microscope (TEM). Please see FIGS. 19a to 19d. Large scale continuous nanofibrous structures were observed on the polymer films, which also showed distinct modulus to the surrounding region. Please see FIGS. 3a to 3f. The nanoscale UPy aggregates were stained by osmium tetroxide vapor and visualized in the TEM images. Further polarized optical microscopy (POM) imaging and powder X-ray diffraction (XRD) indicated the reversible crystalline-amorphous transition of the elastomer under water treatment. Birefringent pattern observed on dry pristine sample would disappear when the sample was immersed in water, and re-appear when the sample was dried subsequently. Please see FIG. 4a. Similarly, superposition of an amorphous halo and well-defined reflections were observed in XRD, confirming the semi-crystalline property of the microphase-separated elastomer. The diffractive peaks disappeared when the samples were put underwater and the signal recovered when the samples were blew dried at room temperature. Please see FIG. 4b.

Figures 19A, 19B, 19C, 19D, 19E, 19F, 19G:
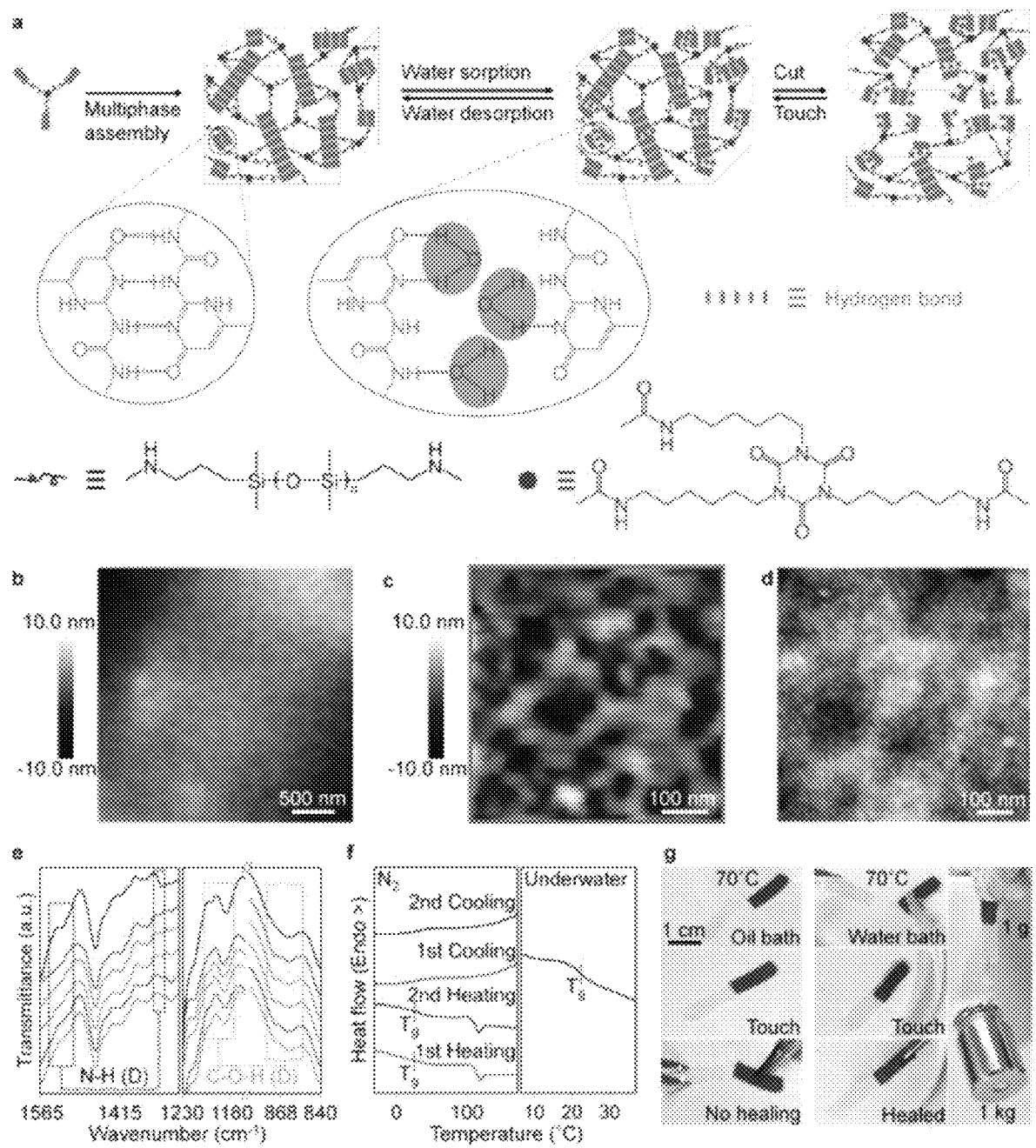
FIGS. 19a to 19g illustrates an embodiment of a multiphase design for underwater self-healable elastomer according to the present invention.

FIG. 19a illustrates the self-assembly of $(UPDMS)_3THDI$ units into 3D network via the dimerization of UPy (blue) motifs and the assembly of UPy stacks. UPy dimers dissociate and exchange with water molecules (green dots) upon water sorption to release free UPy motifs at the interface. UPy dimers and stacks reform via touching the two separate pieces together and finally heal by water desorption. FIGS. 19b and 19c are AFM height images of the sectioned sample film. FIG. 19d is a TEM image of the sectioned sample film. FIG. 19e is a graph of ATR-IR spectra showing HID exchange between the elastomer film and water vapor. (Top to bottom: before $D_2O$ exposure and 0, 1, 2, 3, and 4 min after $D_2O$ exposure. Dashed lines indicate the two pairs of shifting peaks. FIG. 19f is a graph showing DSC traces of the as-prepared material in dry nitrogen ($N_2$) and underwater. FIG. 19g are images showing, cutting pieces (stained with red and yellow colors) are still separated when immersed in 70° C. silicone oil bath for 12 h contact. When contacting in 70° C. water bath for 5 min, the two pieces adhere firmly and can withstand a 1 kg counterweight. The weight of the healed sample is 1 g.

Figure 5:
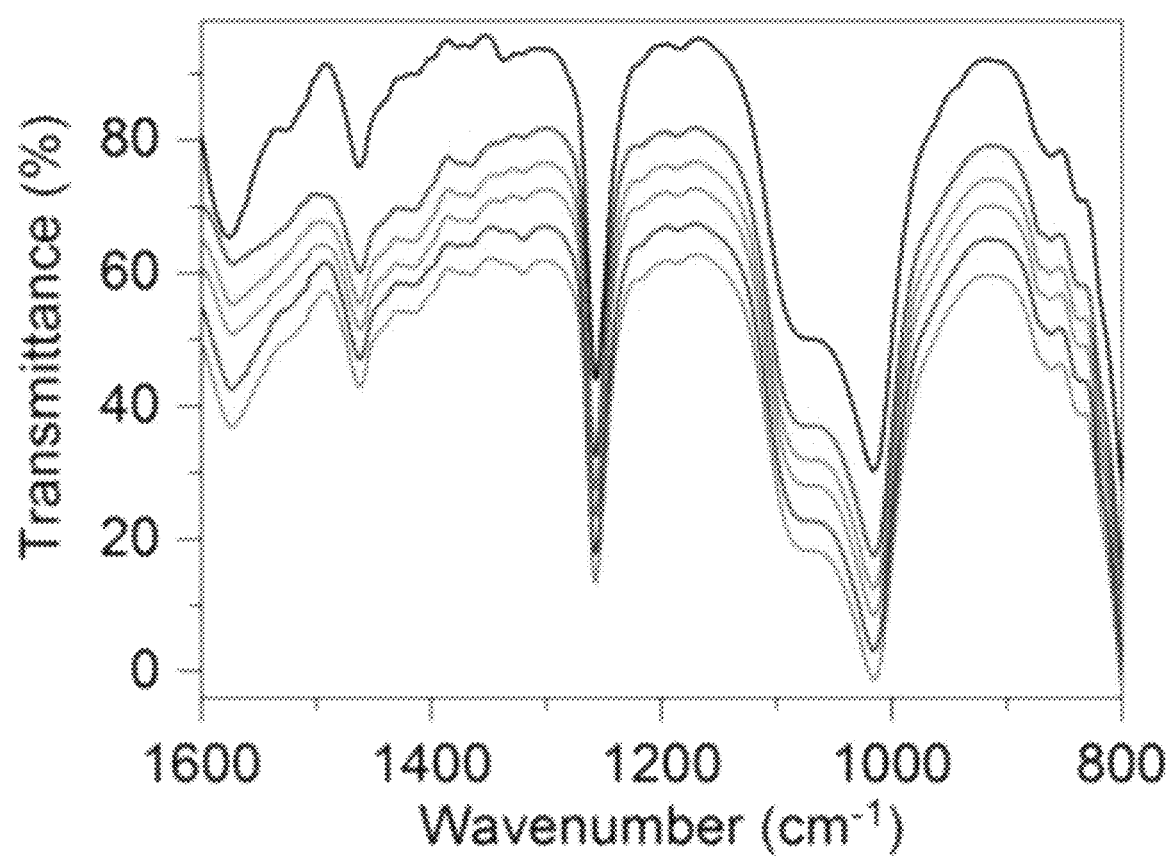
FIG. 5 is a full ATR-IR spectra corresponding to FIG. 19e showing H/D exchange between the (UPDMS)$_3$THDI film and water vapor, in which, from top to bottom of the graph, before D$_2$O exposure and 0, 1, 2, 3, and 4 min after D$_2$O exposure is illustrated.

To further understand the molecular mechanism of reversible crystalline-amorphous transition of the elastomer under water treatment, studies of regarding the interaction of water molecules and the elastomer were carried out. Because water molecules would cause dissociation of the UPy dimers and stacks, the interaction between water molecules and UPy motifs inside the elastomer was investigated by a hydrogen/deuterium (HID) exchange method of using active protons in OH and $NH^{39}$. The H/D exchange experiment was carried out by immersing a sectioned sample film in $D_2O$ for 10 s to ensure adsorption and binding of the $D_2O$ molecules, followed by attenuated total reflectance Infrared (ATR-IR) examination[40]. After $D_2O$ exposure, four representative IR peaks related to O—H or N—H bending shifts were observed. Please see FIG. 5. When the sample film was left in ambient air [relative humidity (RH)~35%], the D peaks gradually shifted back to corresponding H peaks in a few minutes. Please see (FIG. 19e).

Figure 6:
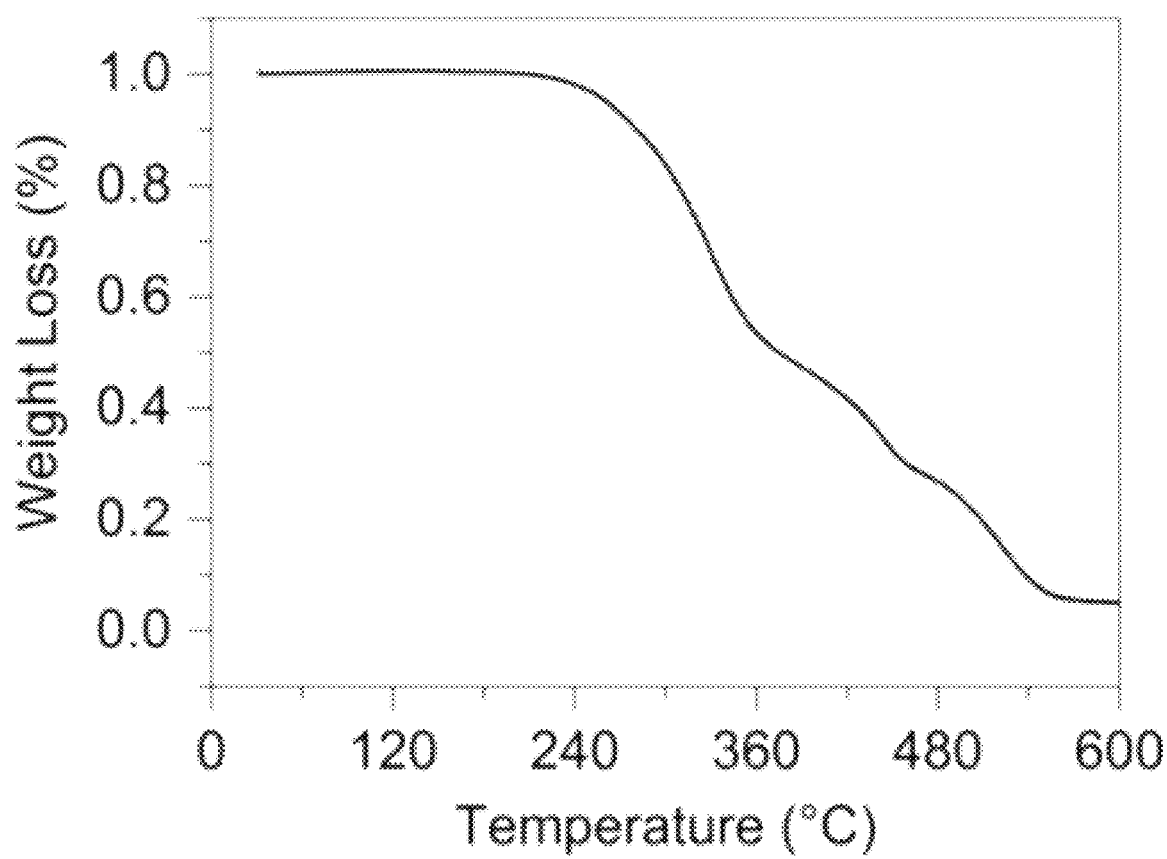
FIG. 6 is a thermal analysis of the (UPDMS)$_3$THDI, in which, at a heating rate of 10° C.·min$^{-1}$ under N$_2$ atmosphere, a TGA curve of the (UPDMS)$_3$THDI from 25 to 600° C. is indicated.

Thermogravimetric analysis (TGA) and differential scanning calorimetry (DSC) were used to determine the thermal properties of the semi-crystalline elastomers. The TGA showed the weight loss onset at 210° C. Please see FIG. 6. Both the first and second heating traces of DSC indicate a weak endothermic transition at 34° C., which is associated with the glass transition temperature (Tg), and an endothermic peak at 120° C., corresponding to melting of the crystalline phases. Please see FIG. 19f. The Tg of PDMS is lower than −90° C., and the increased Tg of the elastomer could be ascribed to the hydrogen bonding between oligomers which restrict the mobility of the oligomer chains. When the elastomer sample was sealed with a small amount of water, the measured Tg decreased to 22.2° C., indicating the plasticized and improved mobility of oligomers caused by water assisted dissociation of the UPy dimers and stacks.

Figure 7:
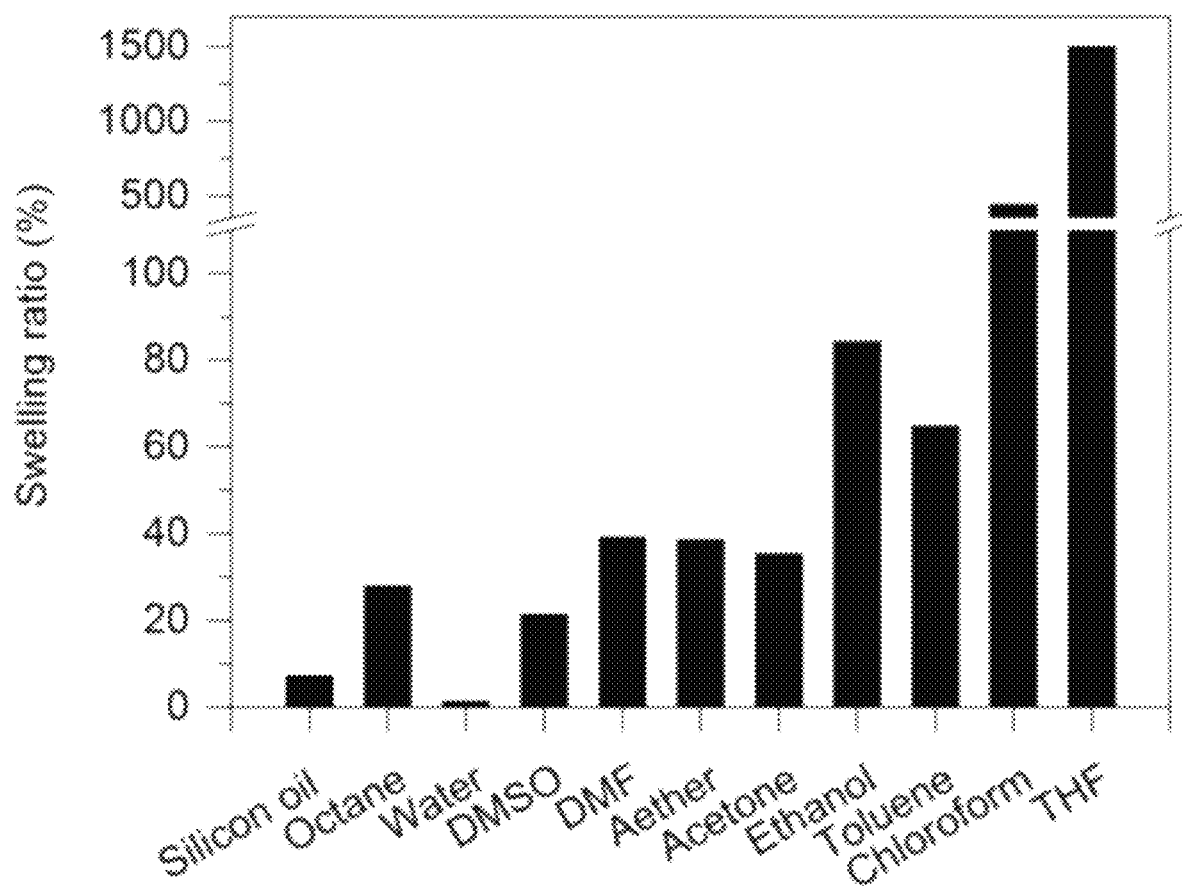
FIG. 7 is a graph illustrating swelling ratios of (UPDMS)$_3$THDI films in different solvents for 48 h at room temperature, in that the swelling ratio was measured as (mass of the swollen film—mass of the dry film)/(mass of the dry film)
Figures 8A, 8B:
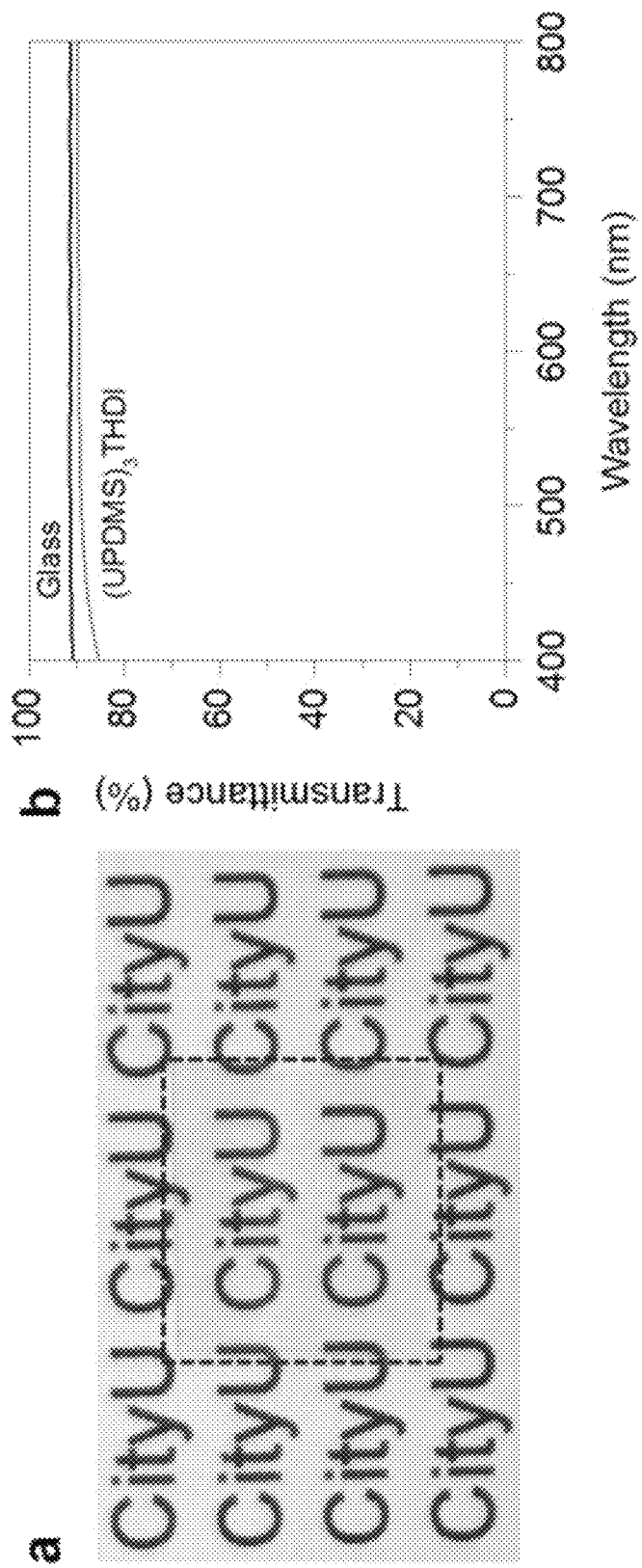
FIG. 8a is a picture of a self-supported (UPDMS)$_3$THDI film.
FIG. 8b is a graph of the UV-Vis absorption spectra of glass and a self-supported (UPDMS)$_3$THDI film.

The as-prepared elastomer film could be swollen by a couple of solvents, which follows a similar trend to other siloxane based elastomers. Please see FIG. 7. However, when it is treated with water or humid air, the film would turn softer and sticky, which is favorable for interface contact and healing. We then compared the self-healing ability of the elastomer immersed in water and silicone oil. Both water and silicone oil could merely swell the elastomer, and the silicone oil provides a water-free environment for comparison. As shown in FIG. 19g, two pieces of samples could not adhere to each other when contacting in silicone oil bath at 70° C., but they adhered to each other quickly and firmly when the contact happened in water bath at the same temperature, which implied that the existence of water molecules is essential for healing of the (UPDMS)$_3$THDI films.

Figures 9A, 9B, 9C, 9D:
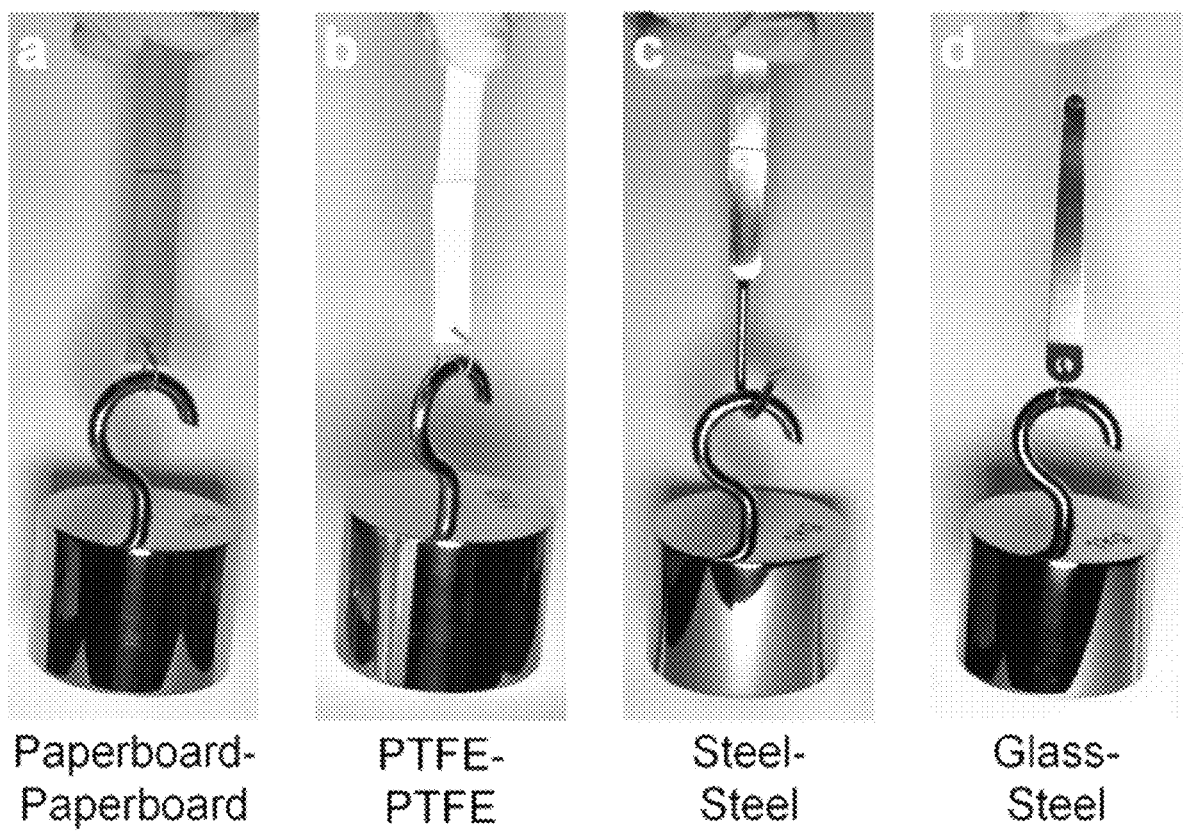
FIGS. 9a to 9b illustrate different applications of (UPDMS)$_3$THDI materials as adhesive materials. a-d, Macroscopic adhesive behavior of (UPDMS)$_3$THDI materials on the surfaces of paperboard, PTFE, stainless steel and glass.
Figure 10:
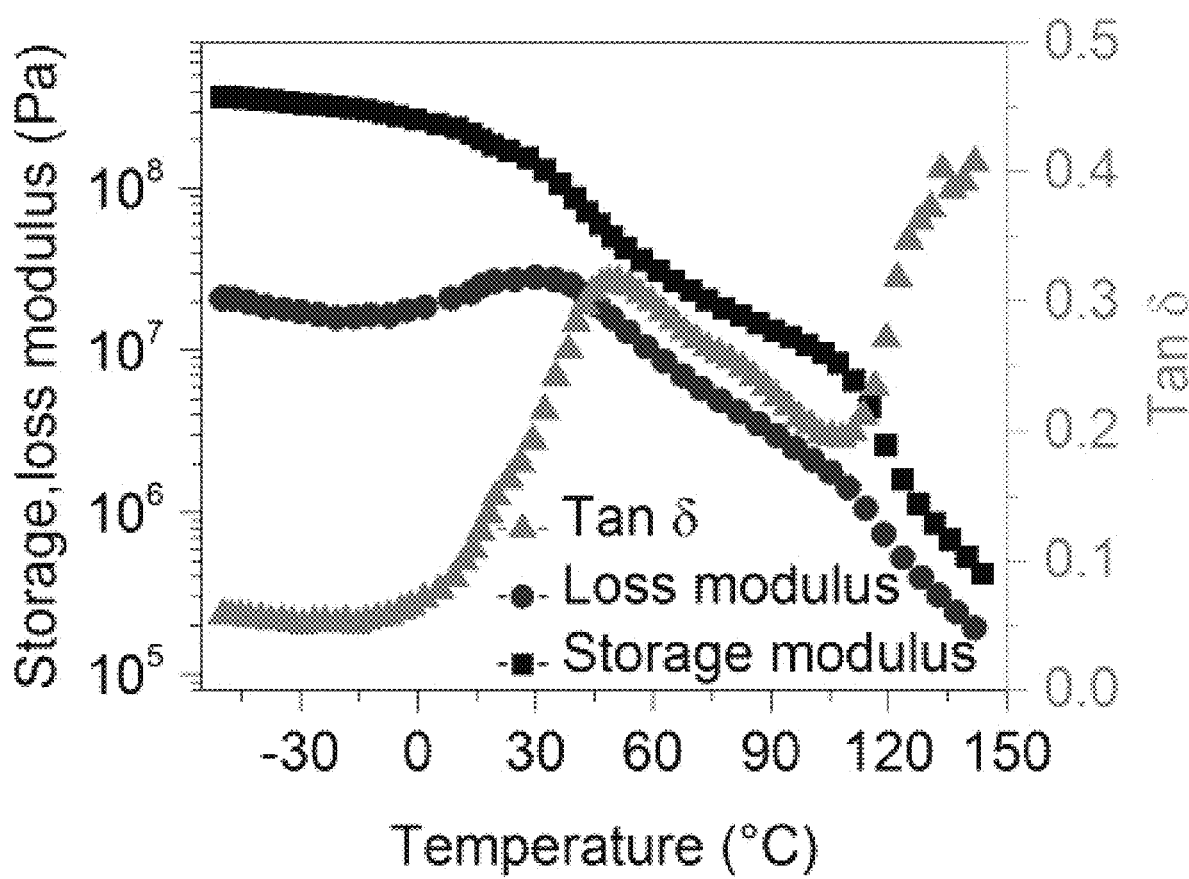
FIG. 10 is a graph showing representative dynamic mechanical analysis (DMA) trace of (UPDMS)$_3$THDI.
Figure 11:
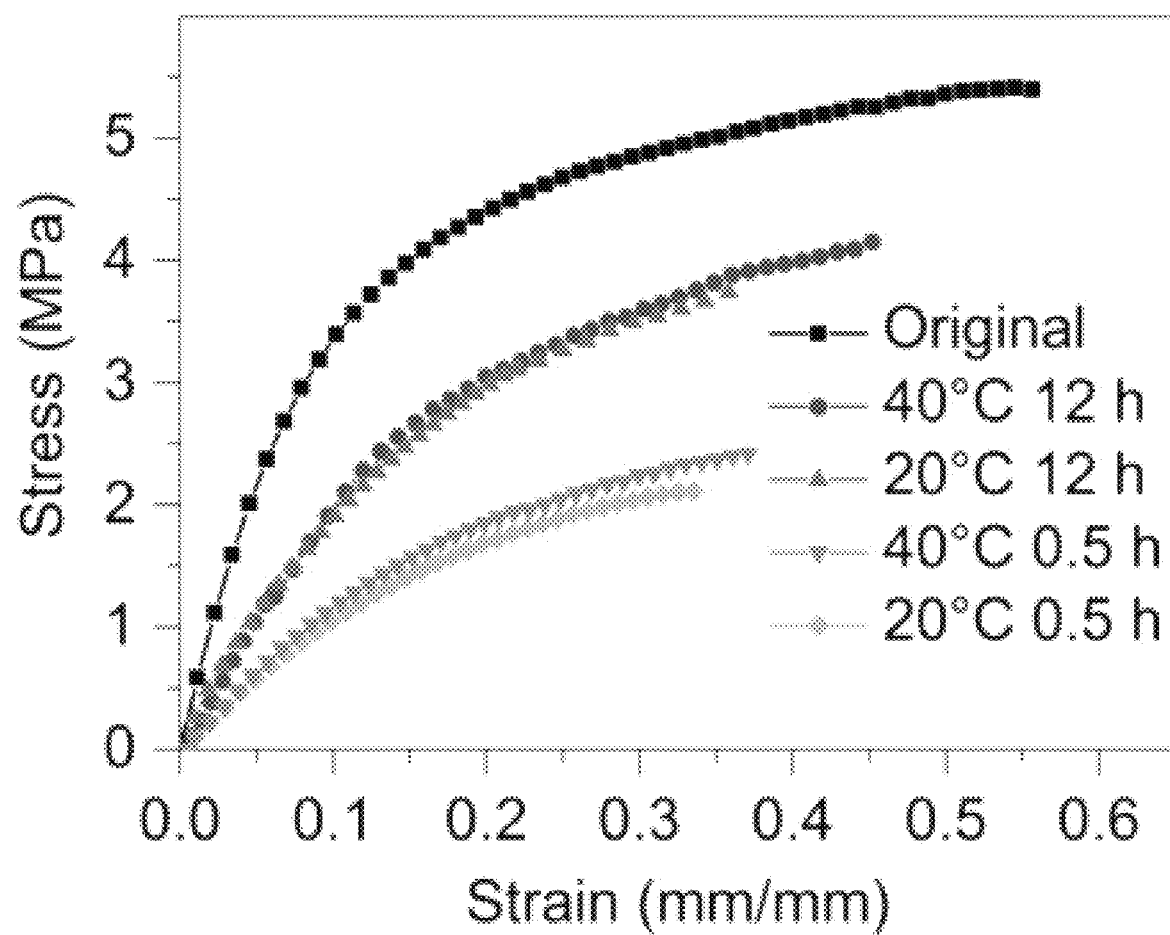
FIG. 11 is a graph showing results of studies of self-healing of (UPDMS)$_3$THDI in air at various healing temperatures and times.

Self-healing and mechanical properties. The semi-crystalline elastomer can readily be melt-processed into transparent solid objects or used as powerful adhesive when attached to various surfaces, such as glass, paperboard, stainless steel and even polytetrafluoroethylene (PTFE) by heating the as-prepared grains above the melting point, indicating typical thermoplastic characteristics. Please see FIGS. 8a to 9d. The resulting (UPDMS)$_3$THDI films exhibits a high Young's modulus ~47.39±1.03 MPa by tensile testing, storage modulus ~151.4±10.7 MPa by dynamic thermomechanical analysis (DMA), respectively, at room temperature. Please see FIG. 9.

The healing properties of (UPDMS)$_3$THDI films in dry air and underwater were following studied. Two separated films with 1 mm thickness were contacted with each other under gentle contact pressures (~50 kPa). Because the films are rigid, they could not form ultimate interface contact, leaving cavities of 10-30 μm between them. Please see FIGS. 20a and 20d. The healing would not happen when the films were put in air at room temperature. Further heating up to 70° C. would soften the film and facilitate the contact healing. However, there are still cavities of a few microns after healing for 12 h. Please see FIGS. 20b and 20c. In comparison, the healing process could be accelerated and the healing quality could be improved when it is taken place underwater—the two films could fuse together as soon as heating for 5 min at 70° C. Please see FIGS. 20d and 20f.

Figures 20A, 20B, 20C, 20D, 20E, 20F, 20G, 20H, 20I:
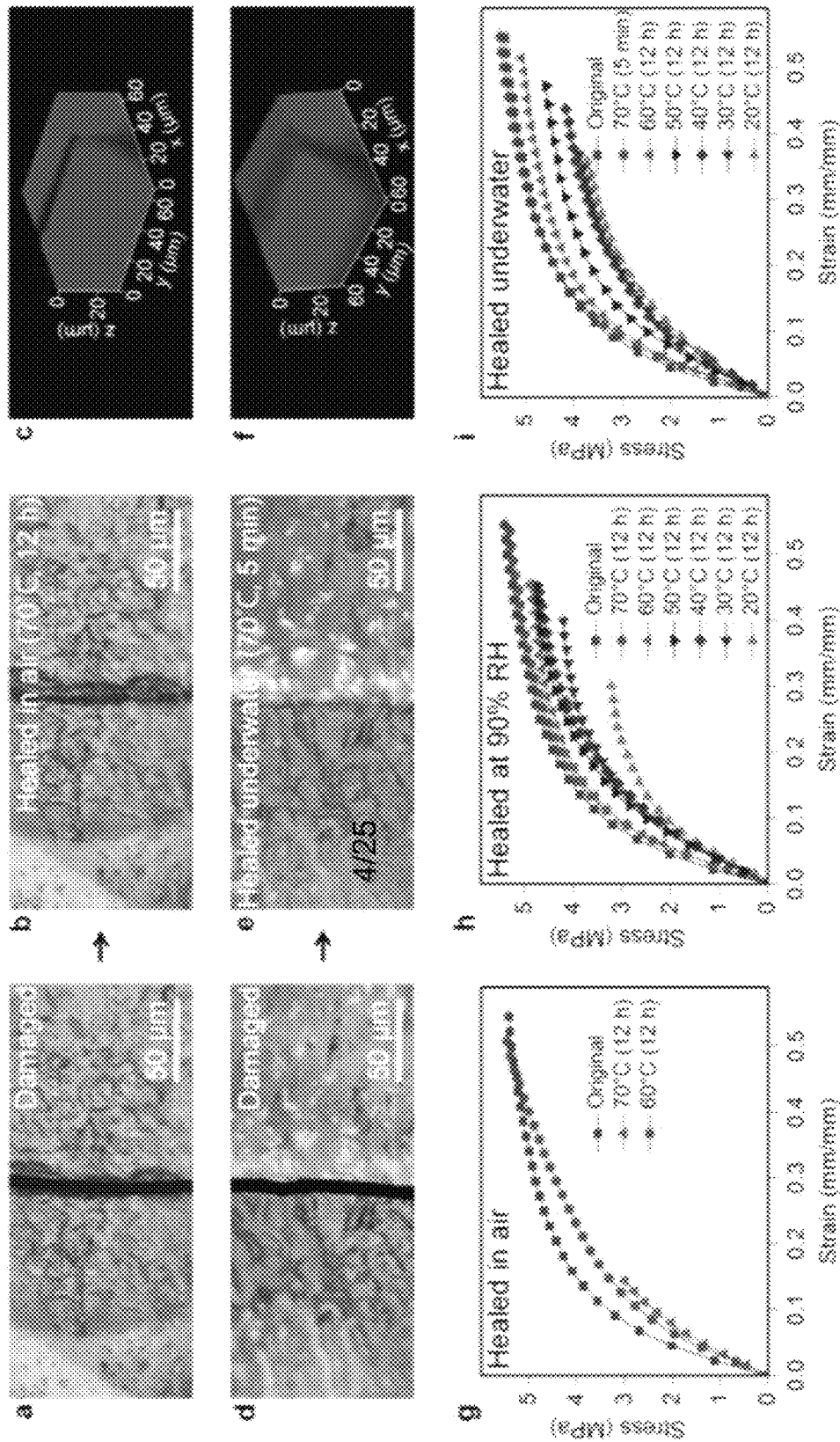

FIG. 20a is an optical microscopic image of a damaged film in air, FIG. 20b is an optical microscope image of the film after healing in air (70° C.) for 12 h. FIG. 20c is a confocal microscope image on the healed region of the sample (stained with Nile red). FIG. 20d is an optical microscopic image of a damaged film underwater. FIG. 20e is an optical microscope image of the film after healing underwater (70° C.) for 5 min. FIG. 20f is a c f, Confocal microscope image on the healed region of the sample (stained with Nile red). FIGS. 20g to 20i are graphs showing tensile stress-strain curves of healed (UPDMS)$_3$THDI films in different conditions, in which FIG. 20g shows the films healed in air for 12 h at different temperatures; FIG. 20h, shows the films healed at 90% RH for 12 h with different temperatures, and FIG. 20i shows the films healed underwater for 12 h at various temperatures except 70° C., for which the healing time is 5 min.

Further quantitative study on tensile tests decoupled the effect of water, healing temperature and healing time was carried out. Please see FIGS. 20g to 20i, FIG. 11 and below Tables 2 and 3). Basically, the healing efficiency increases by raising atmosphere relative humidity, increasing healing temperature and prolonging the healing times. When the healing process is taken in air (room temperature and 35% RH), the separate samples cannot adhere to each other when the healing temperature is below 40° C., and the healed samples cannot fully recover the strength or strain even after healing at 70° C. for 12 h. In comparison, the samples could simply adhere to each other when they were put in humid air or underwater at room temperature.

Figure 12:
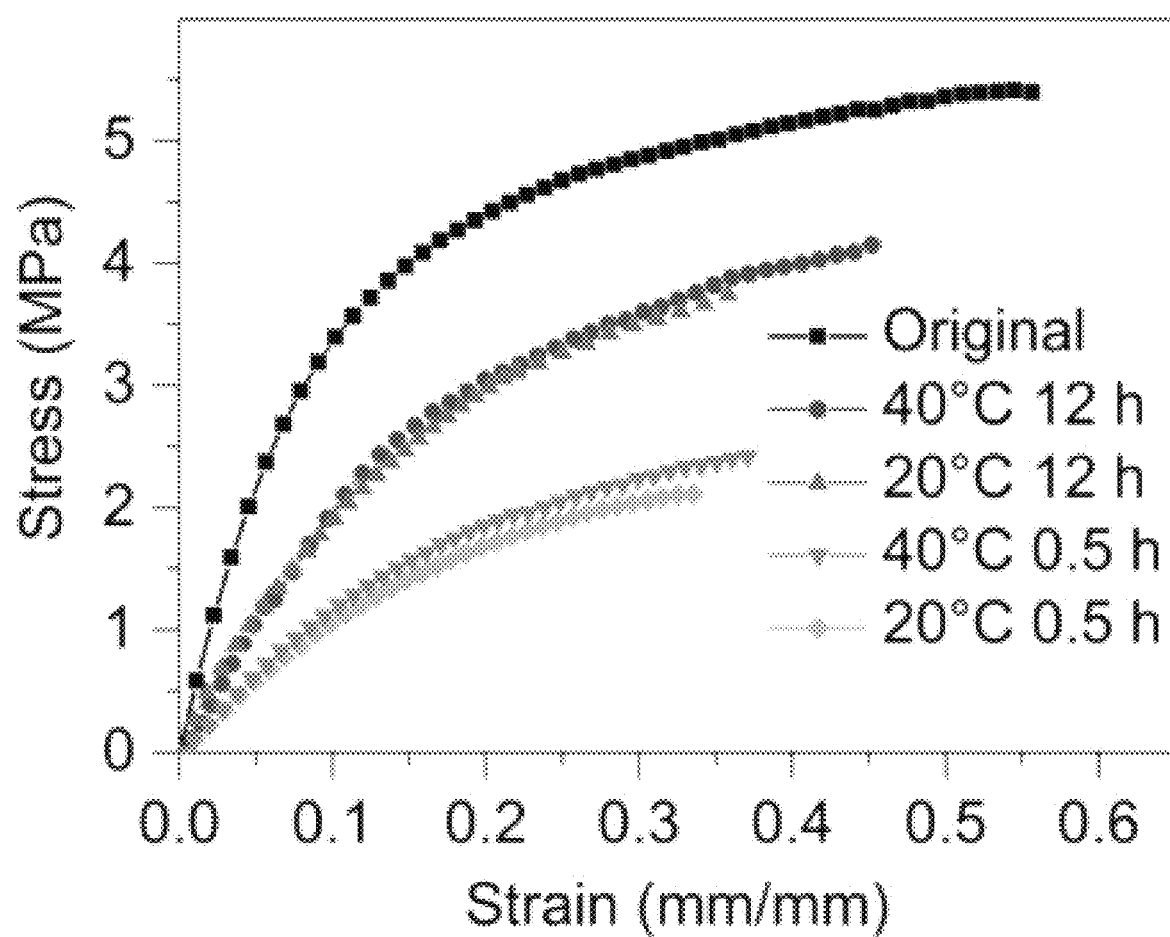
FIG. 12 is a graph with tensile stress-strain curves for the (UPDMS)$_3$THDI sample through five generations of molding from powder to film.
Figures 13A, 13B, 13C, 13D, 13E:
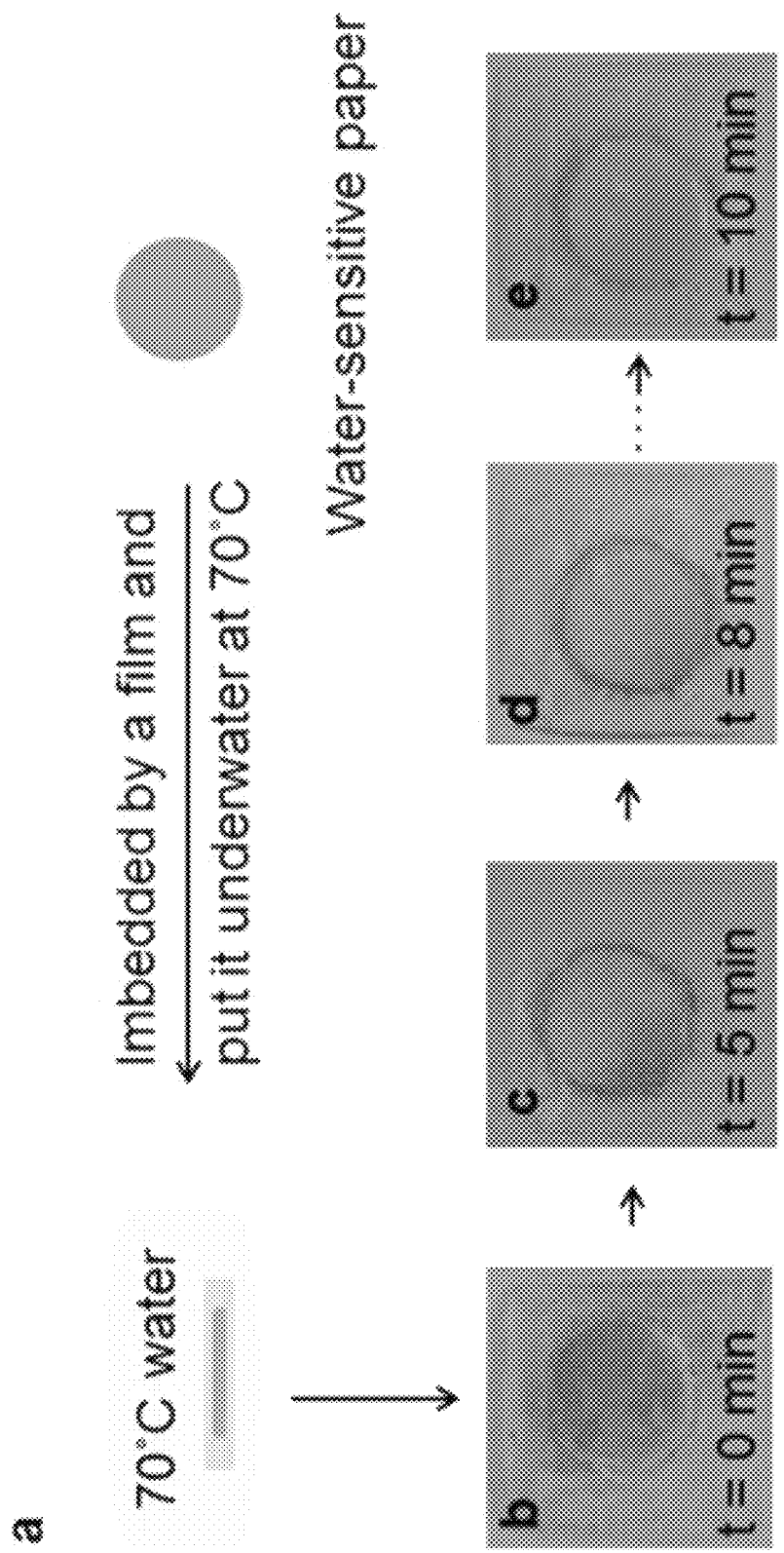
FIGS. 13a to 13e is a series of schematic and photographic representation demonstrating of the penetration of water vapor through the (UPDMS)$_3$THDI film.

At 90% RH, the healing process could kick off at 20° C., and the healed samples could recover 98% strength if the healing process was taken at 70° C. for 12 h. When the samples are underwater, the whole healing process is significantly accelerated, and it only needed 5 min for the healed samples to reach the same quality as compared to the pristine ones. Moreover, the healable samples could also be re-ground to powders and then reprocessed to new films by heating repeatedly. Little decrease of mechanical properties was observed from the tensile-test results of recycled polymers even after the fifth generation of reprocessing. Please see FIG. 12 and below Table 4.

Mechanism of the underwater self-healing. UPy-based supramolecular polymers had been known for both tunable mechanical properties by controlling the stacking of UPy dimers and the rapid self-healing ability from reversible dissociation and bonding of UPy dimers under thermal treatment to some extent. However, those UPy-based supramolecular polymers can rarely heal themselves underwater or in moisture. Even those polymers that UPy motifs are embedded in alkyl based hydrophobic environment still do not show competitive performance in underwater self-healing, and the water treatment does not affect the mechanical properties of the hydrophobic polymers incorporated with UPy motifs. This is probably because water is fully shielded by those alkyl based hydrophobic polymers, and the dissociation of UPy dimers is thus inhibited. In our case, the UPy-ricked domains that contain UPy dimers and stacks are among the water-permeable and hydrophobic siloxane domains. The hydrophobic chemical environment of siloxane domains could suppress swelling, shield the hydrogen bonds and protect the UPy dimers and stacks, but their low but sufficient water permeability could allow water molecules to travel through the sample to help disassembly of the UPy stacks and the dissociation of UPy dimers.

Referring to FIGS. 13a to 13e, there is shown a piece of water vapor sensitive paper embedded into a polymer film, which was then immersed into water bath at 70° C. for water vapor diffusion. The blue colored paper turned into pink after water adsorption in the water bath within 10 min. As a comparison, the blue paper won't perform a color change when putting in air for 30 days. The low water permeability and the binding of water molecules to the oligomers were demonstrated previously in FIG. 19e and FIGS. 13a-13e.

Figures 14A, 14B, 14C, 14D:
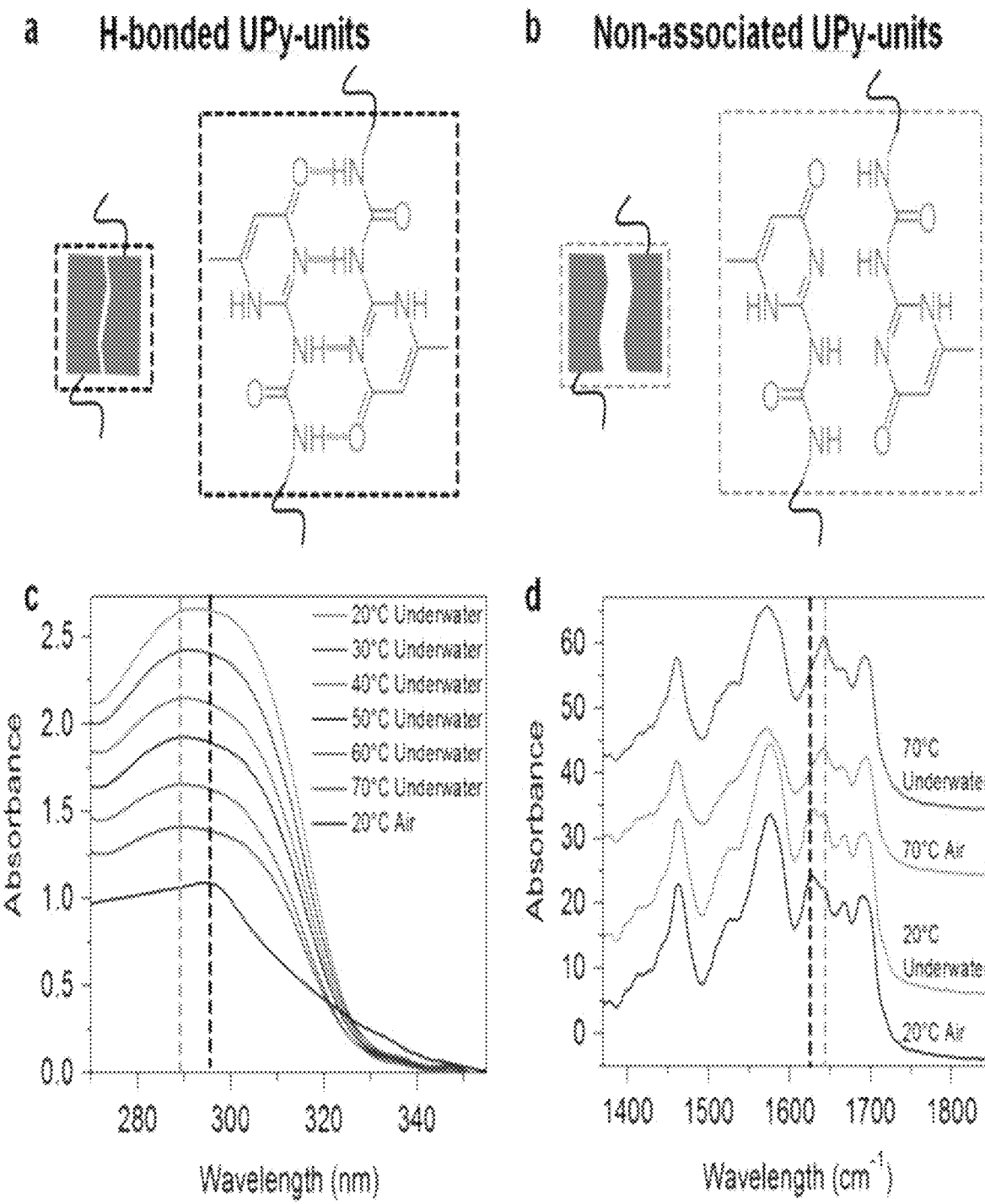
Figures 15A, 15B, 15C, 15D, 15E, 15F:
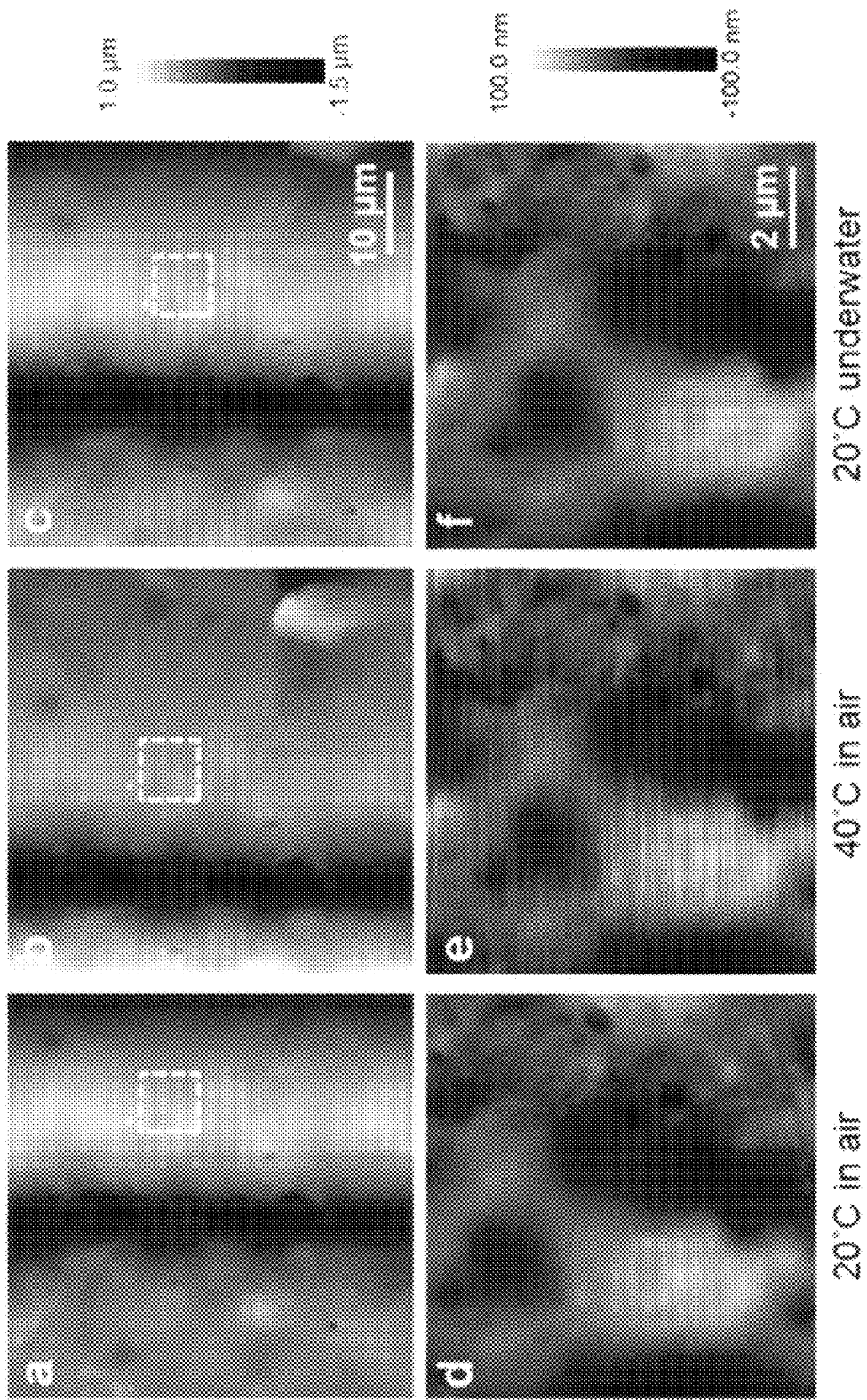
FIGS. 15a to 15f are images showing morphologies of a (UPDMS)$_3$THDI film in conditions of 20° C. air, 40° C. air and 20° C. underwater obtained from AFM, in that the same sample was continuously scanned in the three different conditions.

The association/dissociation behavior of UPy dimers and assembly/disassembly of UPy stacks were investigated in more detail by using ATR-IR and UV-Vis spectroscopy. In the temperature dependent UV-Vis spectroscopy which the samples were immersed in water, a shift of the absorption peak from 292 nm to 288 nm was observed when the water temperature changed from 20° C. to 70° C., indicating the breaking of hydrogen bonding and the dissociation of the UPy dimers. Please see FIG. 14c. Further ATR-IR studies of the as-prepared samples indicate distinct loss of urea hydrogen bonding and hence dimerization and stacking deprivation of UPy motifs upon wetting/heating. Please see FIG. 14d. The dissociation of UPy motifs underwater is favor to increase the chain mobility and facilitate the healing of the film.

Figures 16A, 16B, 16C, 16D, 16E, 16F:
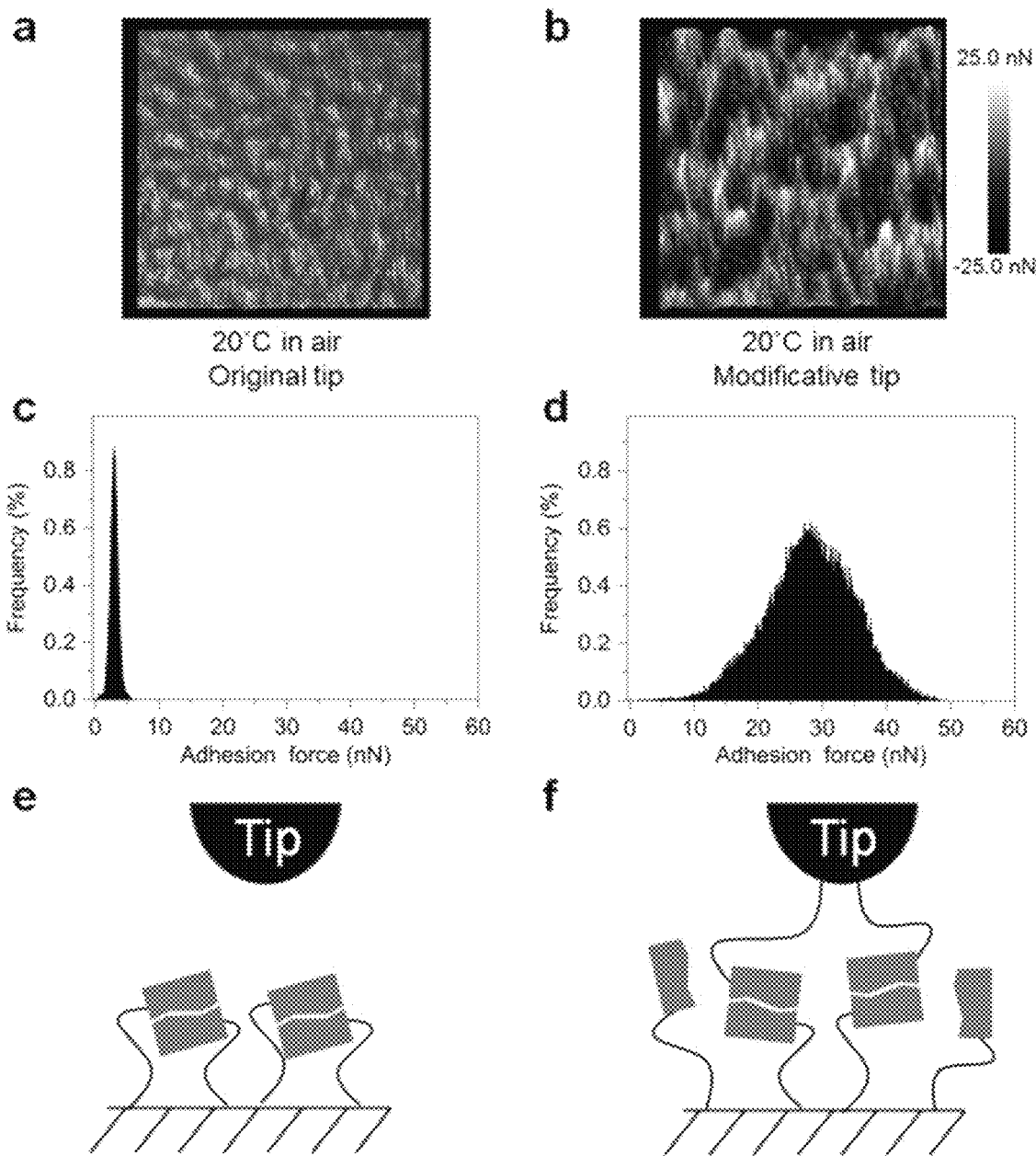
FIGS. 16a, 16c and 16e are an image, a graph and a schematic diagram showing adhesion force of (UPDMS)$_3$THDI obtained from the bear tip.
FIGS. 16b, 16d and 16f are an image, a graph and a schematic diagram showing adhesion force of (UPDMS)$_3$THDI obtained the tip modificated by UPy motifs, in that UPy motifs were modified on the AFM tip by immersing the tip in APTES solution and UPy-NCO solution, successively.

The surface morphology, surface adhesion force and modulus mapping of (UPDMS)$_3$THDI films were evaluated using AFM in the conditions of 20° C. air, 40° C. air and 20° C. underwater. Please see FIGS. 21a to 21i. For direct composition, one single sample was used in all three conditions and performed the tests in situ. The surface adhesion force and modulus values were averaged from 65,025 test points in an area of 500 nm×500 nm scanning region. The surface morphology changed very little in all three conditions, indicating the structural integrity of the (UPDMS)$_3$THDI films. Please see FIGS. 15a to 15f. While the measured modulus in 40° C. air and 20° C. underwater were 10.9 MPa and 11.3 MPa, respectively, which were lower than that of 13.7 MPa in 20° C. air, indicating that the materials were soften underwater and at elected temperature as the loss of UPy stacking, which were in agreement with the results from DSC on the lowering of Tg. Please see FIGS. 21d to 21f. Noting that the modulus measured from AFM is systematically smaller than that measured from tensile tests. Moreover, the adhesion force $F_{ad}$ in the condition of 20° C. underwater was 4.6 nN, which was much larger than that of 3.0 nN in 20° C. air and 3.7 nN in 40° C. air (FIG. 3g-i). There are two factors that may lead to the increase of surface adhesion force: the soften of the film and the increasing hydrogen bonds caused by exchange of water protons with UPy motifs in aqueous media. Considering the little difference on the film modulus between conditions of 20° C. underwater and 40° C. air, the remarkable increase on the adhesion force could reflect the dissociation of a large amount of UPy dimers underwater. In addition, the acquired adhesion force under 20° C. water from a UPy-modified tip is 28.2 nN, a 3-fold increase comparing with the results gained from bear tips. Please see FIG. 16. Such strong adhesion force clearly simulated the binding of the UPy motifs at the interface during material healing.

Figures 21A, 21B, 21C, 21D, 21E, 21F, 21G, 21H, 21I:
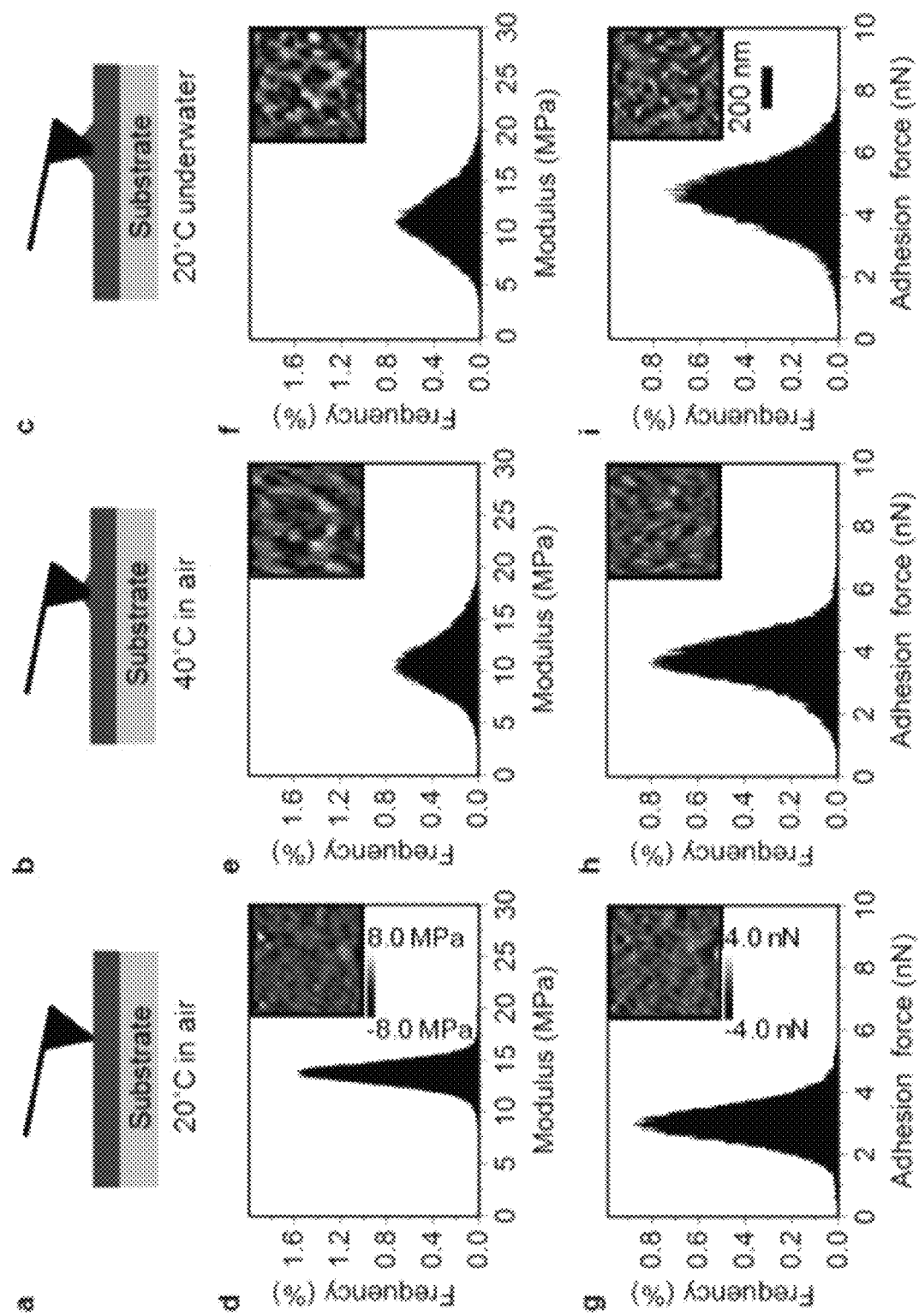

FIGS. 21 a to 21c are schematic illustration of measuring adhesion force and modulus in different conditions. They were measured by approaching the tip to the (UPDMS)$_3$THDI films and then retracting the tip. FIGS. 21d to 21f are graphs showing distribution of modulus (UPDMS)$_3$THDI films measured via bare AFM tip in conditions of 20° C. air, 40° C. air and 20° C. underwater, respectively. (Insets: corresponding AFM modulus images (500 nm×500 nm)) FIGS. 21g to 21i are graphs showing distribution of adhesion forces measured between the bare AFM tip and (UPDMS)$_3$THDI films in conditions of 20° C. air, 40° C. air and 25° C. underwater, respectively. (Insets: corresponding AFM adhesion force images (500 nm×500 nm))

Water-assisted shape memory properties. In the present invention, because the UPy dimers and stacks would crystalize into stationary microphases, the developed semi-crystalline elastomers also exhibit shape memory properties even though there is no covalent crosslinking in the elastomer. Moreover, we also demonstrated here, water plays an important role in the shape memory properties of the supramolecular elastomer.

Figures 22A, 22B, 22C, 22D, 22E, 22F:
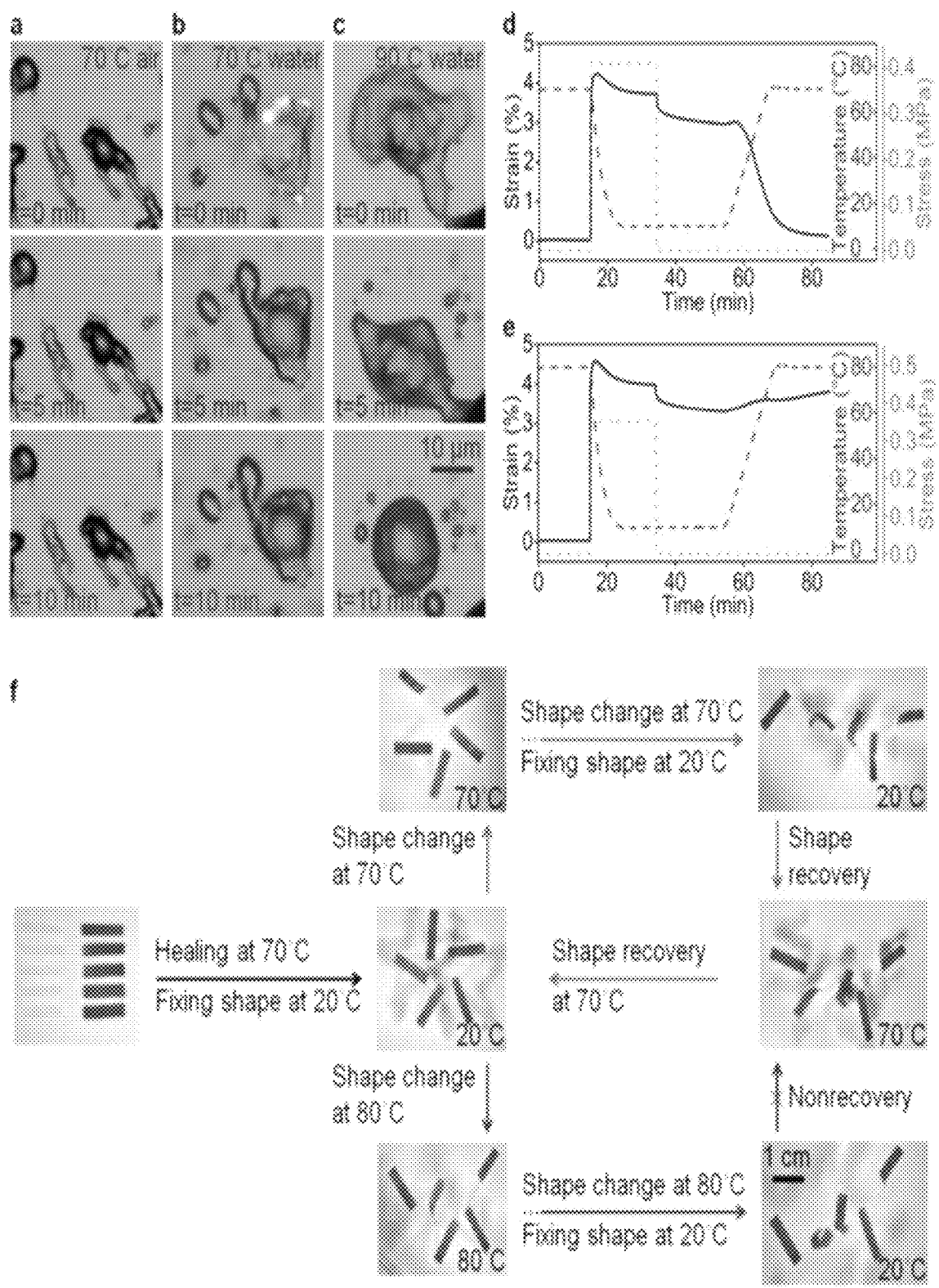
FIGS. 22a to 22f are images, graphs and phots showing shape memory properties of (UPDMS)$_3$THDI films, in which FIG. 22a are optical microscopic images of a (UPDMS)$_3$THDI film after exposing in air (70° C.) for 0 min, 5 min and 10 min, respectively, FIG. 22b are optical microscopic images of a (UPDMS)$_3$THDI film after immersing in water (70° C.) for 0 min, 5 min and 10 min, respectively, FIG. 22c are optical microscopic images of a (UPDMS)$_3$ THDI film after immersing in water (90° C.) for 0 min, 5 min and 10 min, respectively.
Figure 23:
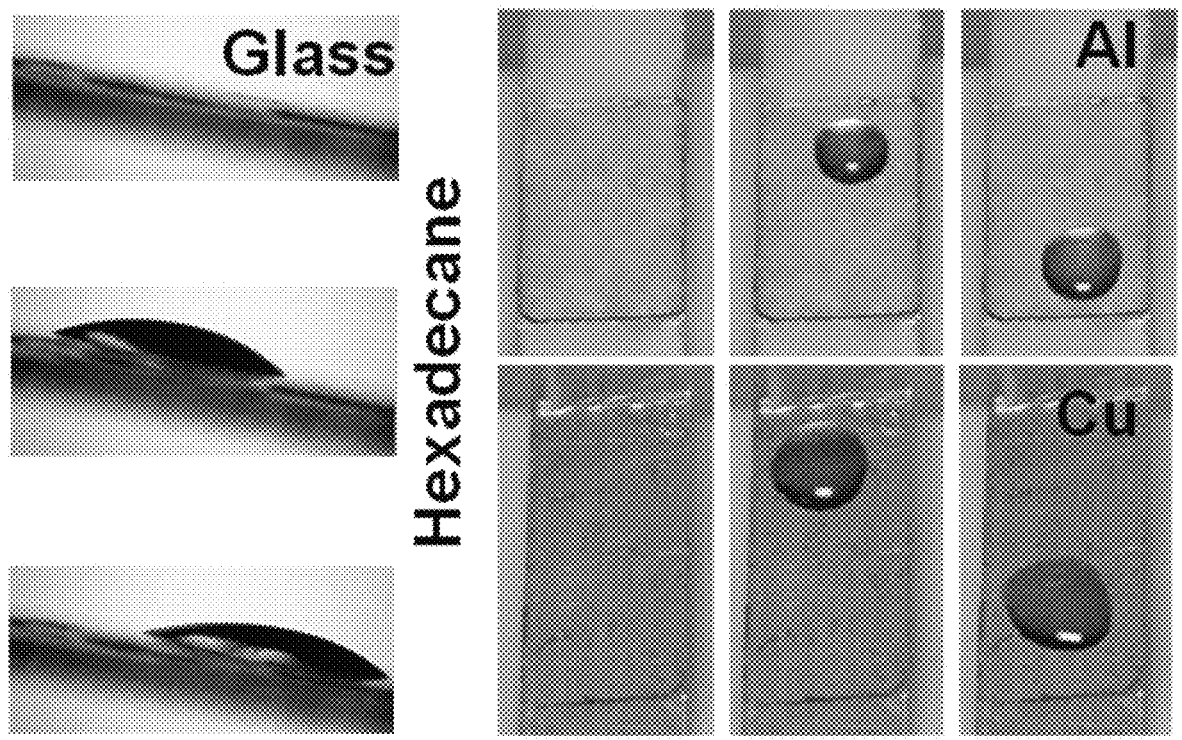
FIG. 23 contains images illustrating proof-of-demonstration of the (UPDMS)$_3$THDI for the use of oil-repellent coating, in which the (UPDMS)$_3$THDI film was coated on glass, alumina foil and copper foil to form a film with ~50-micron thickness, on which a droplet of hexadecane (dyed with Nile Red) could slide down readily without staining the film, showing excellent oil repellency.

FIG. 22a are optical microscopic images of a (UPDMS)$_3$THDI film after exposing in air (70° C.) for 0 min, 5 min and 10 min, respectively. FIG. 22b are optical microscopic images of a (UPDMS)$_3$THDI film after immersing in water (70° C.) for 0 min, 5 min and 10 min, respectively. FIG. 22c are optical microscopic images of a (UPDMS)$_3$THDI film after immersing in water (90° C.) for 0 min, 5 min and 10 min, respectively. FIG. 22d is a graph showing quantitative shape memory cycles for (UPDMS)$_3$THDI films at 70° C. FIG. 22e is a graph showing quantitative shape memory cycles for (UPDMS)$_3$THDI films at 80° C. FIG. 22f are images demonstrating shape memory performance of the healed (UPDMS)$_3$THDI structure. The healed sample exhibited underwater shape-memory behavior at 70° C., while non-recovery when shape changing at 80° C. For better observation, five ribbon samples were stained with red and the other five ribbon samples were stained with yellow.

Figure 17A:
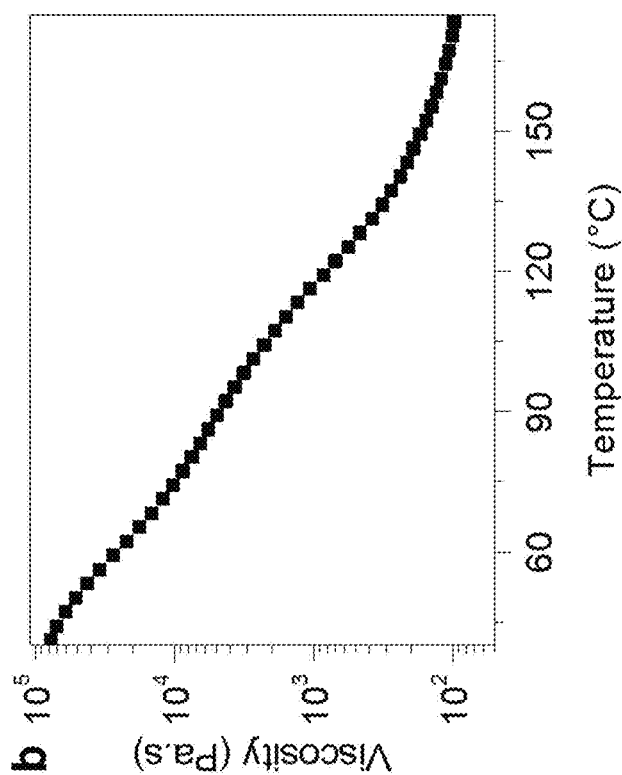
Figure 17B:
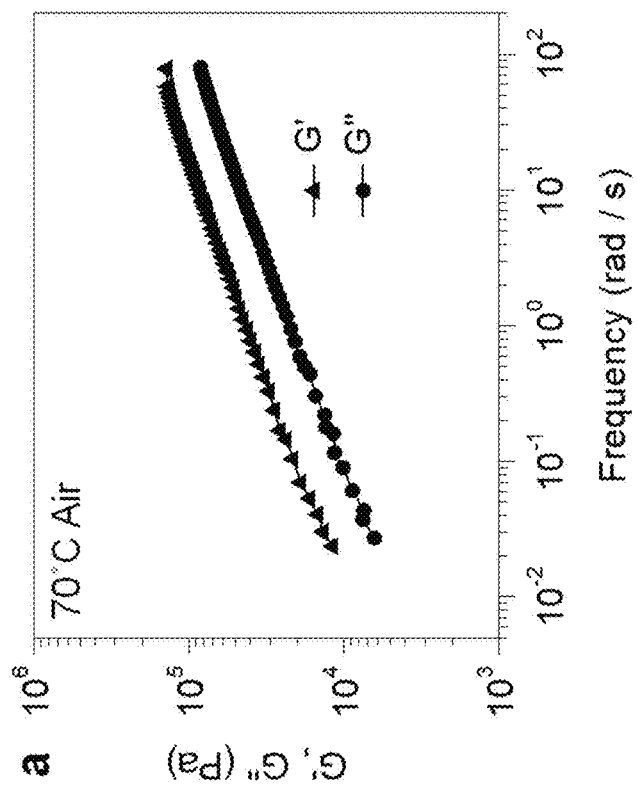
Figure 18:
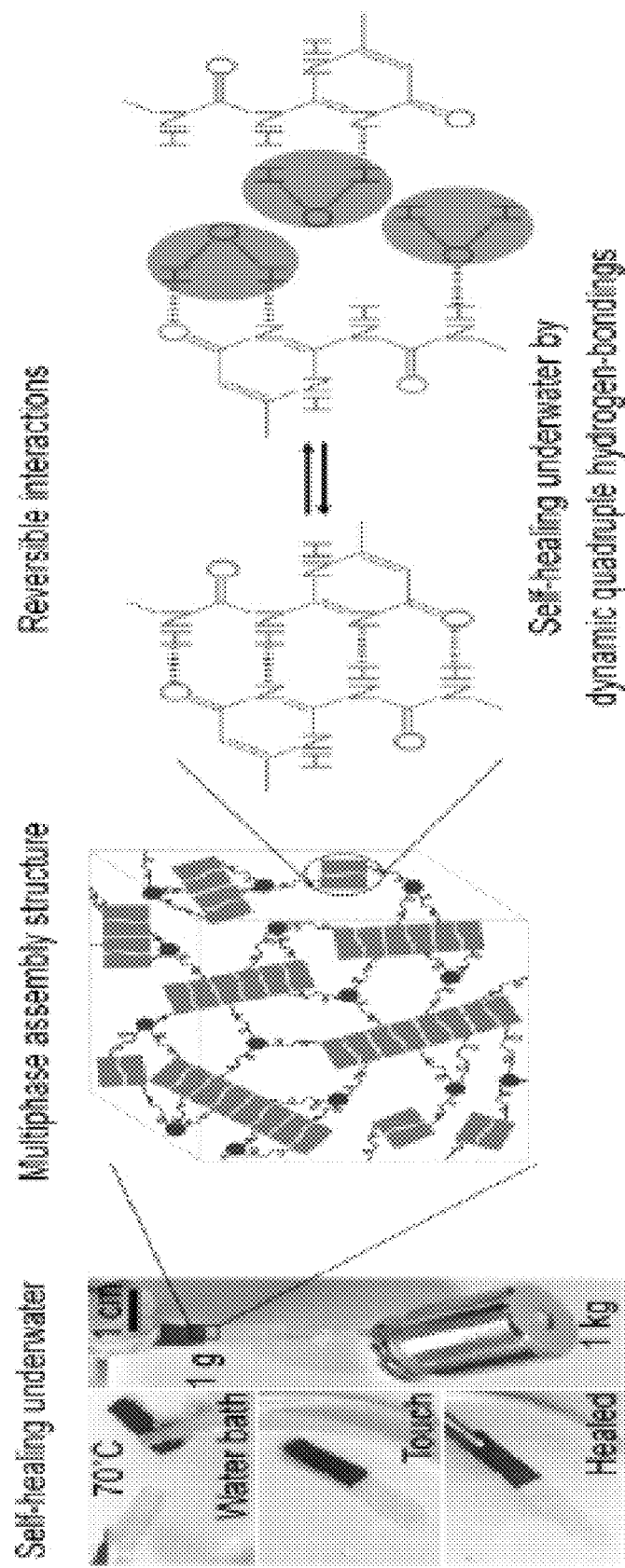
FIG. 18 is a series of photographic images and schematic diagrams illustrating an underwater self-healable supramolecular elastomer obtained by hydrogen bonding assisted multiphase-assembly of siloxane oligomers.

As explained above, the dissociation of UPy dimers happened at 70° C., actually, the supramolecular elastomer exhibited typical properties of crosslinked polymer networks and glassy materials in 70° C. air as both storage (G') and loss (G") moduli increased linearly with increasing frequency and the storage (G') moduli was larger than loss (G") moduli. Please see FIG. 22a and FIG. 17a. While in condition of 70° C. underwater, the elastomer was soften due to the accelerating dissociation of UPy dimers and stacks with the assistant of water molecules. However, the structural integrity of the elastomer could be maintained because the siloxane-riched phase would stabilize and localize the UPy-riched phases, as shown in FIG. 22b. When the heating temperature increased to 80° C. or above, the chain mobility of the oligomers was promoted, and the structural integrity of the oligomer assembly was broken. In this condition, the oligomer assembly was analogue to flowable polymer melts with high viscosity. Please see FIG. 17b and FIG. 22c.

In FIGS. 22a to 22f, the healed sample exhibited underwater shape-memory behavior at 70° C., while non-recovery when shape changing at 80° C. For better observation, five ribbon samples were stained with red and the other five ribbon samples were stained with yellow. Please see FIG. 22f in particular.

The DMA data indicated that (UPDMS)$_3$THDI performed a full shape memory cycle with almost 0% strain residue when the sample was processed at 70° C., indicating a reversible molecular reconfiguration with little energy dissipation. Please see FIG. 22d. However, when the cycle was performed at 80° C., there was almost no change on the applied strain after the stress relief and re-heating, indicating permanent shape change in such condition and huge energy dissipation due to the irreversible breaking of molecular/structural integrity. Please see FIG. 22e.

Then the water-assisted healing properties and shape-memory behavior of (UPDMS)$_3$THDI polymers was combined to obtain a simple shape memory pentacle from ten ribbon samples. Dyed ribbon samples were adhered together to form a pentacle by contacting with each other in 70° C. water bath. Please see FIG. 22f. The obtained pentacle was unfurled to an arbitrary temporary shape at 70° C. underwater, and then cooled down to fix the temporary shape at 20° C., finally the temporary shape would return to the pentacle upon putting into water at 70° C. As a comparison, when the pentacle was put into water at 80° C. for shape change, the secondary shape would be a permanent shape after cooling and could not return to the original shape under 80° C. water.

Mechanical Testing.

The mechanical properties of (UPDMS)$_3$THDI were measured using an Instron machine with a 50 N load cell on samples in standard stress/strain experiments. Samples were prepared by hot-pressing (UPDMS)$_3$THDI into Teflon moulds. The specimens were extended at 10 mm·min$^{-1}$ at room temperature. Each measurement was repeated at least three times. Young's modulus was determined from the initial slope of the stress-strain curves.

Sample Damaging and Healing Tests.

For self-healing tests, a sample was cut into two completely separate pieces. The cut faces were gently pressed together for 1 min and then left to heal in various conditions. The self-healed samples were then subjected to stress-strain tests at room temperature at a pulling rate of 10 mm·min$^{-1}$.

1. Materials and Methods 1.1 Materials and General Measurements

Poly(dimethylsiloxane) bis(3-aminopropyl) terminated ($H_2N$-PDMS-$NH_2$, Mn=850-900) were purchased from Gelest. Tri-functional homopolymer of hexamethylene diisocyanate (THDI) was purchased from Bayer Material Science (Pittsburgh, Pa., USA) and used as received. The remaining chemicals and solvents were purchased from Sigma-Aldrich. All of the chemicals were used as obtained, unless otherwise specified.

Solution $^1$H NMR spectra were recorded on a Bruker DRX 400 NMR spectrometer in CDCl$_3$ at room temperature (20° C.), chemical shifts are reported in ppm relative to tetramethylsilane as an internal standard ($^1$H). The splitting patterns are designated as: s, singlet; t, triplet; q, quartet; m, multiplet. The transmission electron microscopy (TEM) measurements were performed using a transmission electron microscope (FEI/Philips CM-20) operated at an accelerating voltage of 200 kV. Thin slices (~50 nm) of the elastomers were prepared through cryotomy. Osmium tetroxide vapor (popular for heterogeneous polymer systems) was used as a stain[1]. Fluorescence images were obtained using a fluorescence confocal microscope LSM 880 NLO with Airyscan (ZEISS). The semi-crystalline properties of the elastomers were examined under a polarizing optical microscope (POM, Carl zeiss microscope, Axioplan2 imaging) and an X-ray diffraction (XRD) analysis instrument (Brucker AXS, D2 PHASER). Fourier transform infrared (FT-IR) spectra were recorded using a fourier transform infrared spectrometer (PE Spectrum 100) for wavelengths ranging from 400 to 4000 cm$^{-1}$. Infrared spectra were recorded on a fourier transformed-infrared spectrometer (Perkin Elmer Spectrum Two, with a Universal ATR sampling accessory and diamond crystal, Perkin Elmer Instruments, The Netherlands). Transmission spectra were recorded at room temperature in the range from 4000 to 650 cm$^{-1}$ at a resolution of 4 cm$^{-1}$ and with an accumulation of 64 scans for dissociation of UPy aggregates while just one scan for the record of hydrogen/deuterium (H/D) exchange. A sample, consisting of a film of (UPDMS)$_3$THDI on a glass cover slip was placed on the crystal. To achieve good contact between the sample and the crystal, force was applied on top of the sample. To allow for better comparison of spectra with varying intensity, transmission spectra were normalized to the maximum intensity peak (in the region of interest). The photographs of the membrane were taken by a digital camera (Nikon DSVR). The healing process was recorded by an upright optical microscope (Nikon Eclipse Ni-U). Ultra-violet visible (UV-vis) absorption spectra were recorded on a UV-vis scanning spectrophotometer (Shimadzu 1700). The measurements were performed by putting (UPDMS)$_3$THDI films into quartz cuvettes (1 cm) in air or underwater. The rheological studies were carried out using a rheometer (Anton Paar) with parallel plate geometry (15 mm diameter rotating top plate) under dry nitrogen atmosphere. Samples were measured by heating (UPDMS)$_3$THDI films to 175° C. for 5 min before the rotating parallel plate was lowered until the material was observed to flowed out on all sides of the upper plate; subsequently, excess material was removed to prevent edge effects on the data. To ensure sufficient contact, the normal force for all samples was maintained at 0.5 N prior to shearing. Frequency sweep experiments were conducted at 70° C. at a strain of 0.2% and a frequency of 20 rad·s$^{-1}$.

1.2 Synthesis of 2-(6-isocyanato-hexylamino)-6-methyl-4[1H]-pyrimidinone (UPy-NCO)

2-(6-lsocyanato-hexylamino)-6-methyl-4[1H]-pyrimidinone (UPy-NCO) was prepared using a literature procedure from Meijer[2]. 2-Amino-4-hydroxy-6-methylpyrimidine (10 g, 79.9 mmol) was added to a 250 mL round bottomed flask. Hexamethylene diisocyanate (HMDI, 100 mL, 624 mmol) and pyridine (7 mL) were then added, the flask fitted with a reflux condenser, and the mixture stirred at 100° C. overnight under dry nitrogen. Pentane (30 mL) was then added and the solid product, a white powder, was collected by filtration. The solid product was washed 3 times with 125 mL portions of acetone to remove unreacted HMDI and then dried overnight under high vacuum at 60° C. (yield 95%). $^1$H-NMR (400 MHz; CDCl$_3$): δ=13.14 (s, 1H, CH$_3$—C—N$\underline{H}$), 11.87 [s, 1H, CH$_2$—NH—(C=O)—N$\underline{H}$], 10.19 [t, 1H, CH$_2$—N$\underline{H}$—(C=O)—NH], 5.82 (s, 1H, C$\underline{H}$=C—CH$_3$), 3.05-2.98 [m, 4H, NH—(C=O)—NH—C$\underline{H}_2$, C$\underline{H}_2$—NCO], 2.21 (s, 3H, C$\underline{H}_3$), 1.79-1.73 (m, 4H, N—CH$_2$—C$\underline{H}_2$), 1.07-0.96 (m, 4H, CH$_2$—CH$_2$—C$\underline{H}_2$—C$\underline{H}_2$—CH$_2$—CH$_2$—NCO) ppm.

1.3 Synthesis of UPy-NCO-PDMS

UPy-NCO-PDMS was obtained by reaction of 1 equivalent of UPy-NCO and 10 equivalent of Poly(dimethylsiloxane) bis(3-aminopropyl) terminated (H$_2$N-PDMS-NH$_2$). Typically, a 500 mL round bottom flask equipped with a reflux cooler was charged with H$_2$N-PDMS-NH$_2$ (17.4 g, 4 mmol) and chloroform (360 mL), then UPy-NCO (0.1168 g, 0.4 mmol) was added drop wise. After reacting at 60° C. under the protection of nitrogen for 6 h, the solvent chloroform was removed, and the solid product was washed 3 times with 125 mL portions of acetone to remove unreacted PDMS. UPy-NCO-PDMS was then collected by filtration and dried overnight under high vacuum at 60° C. (yield 87%). $^1$H-NMR (400 MHz; CDCl$_3$): δ=13.14 (s, 1H, CH$_3$—C—N$\underline{H}$), 11.87 [s, 1H, CH$_2$—NH—(C=O)—N$\underline{H}$—C], 10.19 [t, 1H, CH$_2$—N$\underline{H}$—(C=O)—NH—C], 5.37 (s, 1H, C$\underline{H}$=C—CH$_3$), 3.77 [q, 8H, NH—(C=O)—NH—C$\underline{H}_2$, C$\underline{H}_2$—NH—(C=O)—NH—C$\underline{H}_2$, NH$_2$—C$\underline{H}_2$—CH$_2$—CH$_2$—Si], 2.19 (s, 3H, Ar—C$\underline{H}_3$), 1.62-1.58 (m, 8H, NH—CH$_2$—C$\underline{H}_2$—CH$_2$—CH$_2$—C$\underline{H}_2$—CH$_2$—NH, NH—CH$_2$—C$\underline{H}_2$—CH$_2$—Si, NH$_2$—CH$_2$—C$\underline{H}_2$—CH$_2$—Si), 1.35-1.28 (m, 4H, NH—CH$_2$—CH$_2$—C$\underline{H}_2$—C$\underline{H}_2$—CH$_2$—CH$_2$—NH), 0.9-0.85 (m, 4H, C$\underline{H}_2$—Si), 0.09-0.05 (m, 48H, C$\underline{H}_3$—Si) ppm.

1.4 Synthesis of tri-UPy Functioned PDMS Supramolecular (UPDIVIS)$_3$THDI (UPDMS)$_3$THDI was obtained by reaction of three equivalents of UPy-NCO-PDMS and one equivalent of THDI in chloroform. Typically, a 250 mL round bottom flask equipped with a reflux cooler was charged with UPy-NCO-PDMS (2.3262 g, 2 mmol) and chloroform (100 mL), THDI (0.336 g, 0.67 mmol) was added drop wise. The mixture was allowed to react at 60° C. under the protection of nitrogen for 6 h. The solvent chloroform was removed, and the solid product was washed 3 times with 125 mL portions of acetone. (UPDMS)$_3$THDI was then collected by filtration and dried overnight under high vacuum at 60° C. (yield 81%). $^1$H-NMR (400 MHz; CDCl$_3$): δ=13.14 (s, 3H, CH$_3$—C—N$\underline{H}$), 11.87 [s, 3H, CH$_2$—NH—(C=O)—N$\underline{H}$—C], 10.19 [t, 3H, CH$_2$—N$\underline{H}$—(C=O)—NH—C], 5.37 (s, 3H, C$\underline{H}$=C—CH$_3$), 3.89 [q, 6H, C$\underline{H}_2$—N—(C=O—N)$_{2], 3.33}$ [q, 30H, NH—(C=O)—NH—C$\underline{H}_2$, C$\underline{H}_2$—NH—(C=O)—NH—C$\underline{H}_2$], 2.2 (s, 9H, Ar—C$\underline{H}_3$), 1.62-1.57 (m, 36H, N—CH$_2$—C$\underline{H}_2$—CH$_2$—CH$_2$—C$\underline{H}_2$—CH$_2$—NH, NH—CH$_2$—C$\underline{H}_2$—CH$_2$—CH$_2$—C$\underline{H}_2$—CH$_2$—NH, NH—CH$_2$—C$\underline{H}_2$—CH$_2$—Si), 1.36-1.28 (m, 24H, N—CH$_2$—CH$_2$—C$\underline{H}_2$—C$\underline{H}_2$—CH$_2$—CH$_2$—NH, NH—CH$_2$—CH$_2$—C$\underline{H}_2$—C$\underline{H}_2$—CH$_2$—CH$_2$—NH), 0.9-0.86 (m, 12H, C$\underline{H}_2$—Si), 0.08-0.04 (m, 144H, C$\underline{H}_3$—Si) ppm.

1.5 Preparation of (UPDMS)$_3$THDI Films

The as-prepared (UPDMS)$_3$THDI powder was heated on a glass slide for 10 min at 175° C. to yield a clear viscous material and then cooled down to form a homogenous film. Self-standing samples were prepared by transferring the viscous material into a Teflon container, and then detached from the Teflon surface after cooling to room temperature.

1.6 Atomic Force Microscopy (AFM) Study

Atomic force microscopy (AFM) measurements were performed on a bioscope catalyst AFM (Broker) using $Si_3N_4$ tips (ScanAsyst-Fluid, 0.7 N/m, Au reflective coating, TELTEC semiconductor pacific limited) in the PeakForce quantitative nanomechanical property mapping (PeakForce QNM) mode. To functionalize AFM tips with UPy groups, the AFM tips were immersed in chloroform for 10 min, rinsed with ethanol, dried with a stream of filtered argon, cleaned for 10 min in an ultraviolet radiation and ozone (UV-O) cleaner (Jetlight), and immersed overnight in a 3-aminopropyltriethoxysilane (APTES) solution [1% (v/v) APTES solution of anhydrous toluene]. The cantilevers were then washed three times with toluene and three times with ethanol and dried with argon. Next, the cantilevers were immersed in the chloroform solution of UPy-NCO for 30 min, subsequently, washed three times with chloroform and dried with argon.

1.7 Mechanical and Self-Healing Tests

Mechanical tensile-stress tests were performed using INSTRON-5566 based on the ASTM D2256 standard. For mechanical tensile-stress and self-healing tests, sample size of 40 mm length×5 mm width×2 mm height, gauge length of 10 mm, and strain rate of 10 mm $min^{-1}$ were adopted. The test was repeated at least three times and the average values were recorded. The thermogravimetric analysis (TGA) was conducted under $N_2$ using a thermal analysis (TA) Q600 differential thermal analyzer (DTG) in the range of 25-600° C. with a heating rate of 10° $C.\cdot min^{-1}$. Differential scanning calorimeter (DSC) measurements were performed under $N_2$ using DSC 2910 instruments with a refrigerated cooling system operating from −30° C. to 175° C. at a scanning rate of 5° $C.\cdot min^{-1}$ and kept under hold conditions for 5 minutes at −30° C. Data from the second heating cycle and the reverse heat flow curve are reported unless indicated otherwise (Tg=glass transition temperature). In addition, $(UPDMS)_3THDI$ in water was also subjected to thermal scanning from 3° C. to 35° C. to compare with that of $(UPDMS)_3THDI$ without water. Dynamic mechanical analysis (DMA) was conducted on TA instruments (Q800 DMA). For self-healing tests, the polymer film was cut into two pieces and then put together. The polymer film was then healed at different conditions. The healed polymer films were then following the same procedure to obtain the tensile stress-strain curves.

Conclusions

The present invention has provided a novel supramolecular elastomer with underwater self-healing properties from self-assembled oligomer network with hydrogen bonding assisted crystallization and multiphase separation. The as-prepared material is strong and stiff due to the enhanced dimerization of UPy motifs and the crystallization of the UPy dimers and stacks among the 3D hydrophobic PDMS structures. The low water permeability of the PDMS phases allows water molecules travel through the polymer network to exchange with UPy motifs but restricts the water retention in the UPy-riched microphases, and the hydrophobic PDMS phases are unaffected by water and would localize the UPy-riched microphases to ensure reversible dissociation and formation of hydrogen bonding between UPy motifs. The dissociation of UPy dimers and the is disassembly of UPy stacks enable the material to be soft, sticky and moldable, contributing to healing underwater, water assisted shape memory property and other controlled mechanical properties. Besides of the fundamental understanding on the effect of chemical environment on the performance of hydrogen bonded supramolecular polymers, we also expect potential applications of our water-enabled, multifunctional self-healable materials in various fields including actuators, smart coatings, wearable electronics and those in biomedical fields.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. It is also to be noted that certain features in connection with the invention are not explained in great detail for brevity reason. However, such features are readily understood by a skilled person in the art. Also, a skilled person in the art will be aware of the prior art which is not explained in the above for brevity purpose.

TABLE 1

IR peaks shifting due to H/D exchange.

| Shifting peaks (H/D) | Peak assignment |
|---|---|
| 1526 $cm^{-1}$/1340 $cm^{-1}$ | N—H in-plane bending |
| 1200 $cm^{-1}$/860 $cm^{-1}$ | C—O—H in-plane bending |

TABLE 2

The effect of healing time, healing temperature and healing conditions of $(UPDMS)_3THDI$.

| Healing conditions | Healing time (h) | Break stress (MPa) | Break strain (mm/mm) | Young's modulus (MPa) |
|---|---|---|---|---|
| 60° C. (air) | 12 h | 3.07 ± 0.29 | 0.15 ± 0.01 | 28.74 ± 1.72 |
| 70° C. (air) | 12 h | 5.46 ± 0.25 | 0.51 ± 0.03 | 31.77 ± 1.56 |
| 20° C. (90% RH) | 12 h | 3.22 ± 0.32 | 0.31 ± 0.01 | 16.87 ± 1.54 |
| 30° C. (90% RH) | 12 h | 4.20 ± 0.24 | 0.41 ± 0.02 | 27.43 ± 1.39 |
| 40° C. (90% RH) | 12 h | 4.71 ± 0.33 | 0.44 ± 001 | 27.51 ± 1.27 |
| 50° C. (90% RH) | 12 h | 4.73 ± 0.28 | 0.45 ± 0.03 | 29.26 ± 1.43 |
| 60° C. (90% RH) | 12 h | 4.92 ± 0.31 | 0.46 ± 002 | 37.61 ± 1.36 |
| 70° C. (90% RH) | 12 h | 5.31 ± 0.27 | 0.55 ± 0.01 | 38.88 ± 1.59 |
| 20° C. (underwater) | 12 h | 3.73 ± 0.29 | 0.36 ± 0.02 | 22.52 ± 1.17 |
| 30° C. (underwater) | 12 h | 3.91 ± 0.30 | 0.38 ± 0.03 | 26.00 ± 1.49 |
| 40° C. (underwater) | 12 h | 4.19 ± 0.28 | 0.45 ± 001 | 25.47 ± 1.32 |
| 50° C. (underwater) | 12 h | 4.57 ± 0.25 | 0.47 ± 0.02 | 29.26 ± 1.53 |
| 60° C. (underwater) | 12 h | 5.09 ± 0.19 | 0.44 ± 0.03 | 37.51 ± 1.24 |
| 70° C. (underwater) | 5 min | 5.53 ± 0.24 | 0.56 ± 0.01 | 38.90 ± 1.46 |
| Original | — | 5.40 ± 0.23 | 0.56 ± 0.01 | 47.39 ± 1.03 |

TABLE 3

The effect of healing time and healing temperature of $(UPDMS)_3THDI$.

| Healing temperature (° C.) | Healing time (h) | Break stress (MPa) | Break strain (mm/mm) | Young's modulus (MPa) |
|---|---|---|---|---|
| 20 | 0.5 h | 2.09 ± 0.31 | 0.34 ± 0.01 | 11.57 ± 1.25 |
| | 12 h | 3.73 ± 0.29 | 0.36 ± 0.02 | 22.52 ± 1.17 |
| 40 | 0.5 h | 2.46 ± 0.30 | 0.37 ± 0.02 | 12.45 ± 1.09 |
| | 12 h | 4.19 ± 0.28 | 0.45 ± 0.01 | 25.47 ± 1.32 |
| Original | — | 5.40 ± 0.23 | 0.56 ± 0.01 | 47.39 ± 1.03 |

TABLE 4

Young's modulus and breaking strength of (UPDMS)$_3$THDI after different generations of molding.

| Cycle number | Break stress (MPa) | Break strain (mm/mm) | Young's modulus (MPa) |
|---|---|---|---|
| 1 | 5.46 ± 0.21 | 0.48 ± 0.01 | 39.06 ± 1.13 |
| 2 | 5.41 ± 0.17 | 0.55 ± 0.03 | 49.02 ± 1.16 |
| 3 | 5.06 ± 0.32 | 0.43 ± 0.03 | 41.32 ± 1.09 |
| 4 | 5.56 ± 0.19 | 0.51 ± 0.02 | 43.71 ± 1.23 |
| 5 | 5.13 ± 0.15 | 0.49 ± 0.01 | 36.90 ± 1.07 |

REFERENCES

The following references are incorporated in their entirety and a skilled person is considered to be aware of disclosure of these references.

1 Brunsveld, L., Folmer, B. J. B., Meijer, E. W. & Sijbesma, R. P. Supramolecular polymers. *Chem. Rev.* 101, 4071-4098 (2001).

2 Rowan, S. J., Cantrill, S. J., Cousins, G. R. L., Sanders, J. K. M. & Stoddart, J. F. Dynamic covalent chemistry. *Angew. Chem. Int. Ed.* 41, 898-952 (2002).

3 Aida, T., Meijer, E. W. & Stupp, S. I. Functional supramolecular polymers. *Science* 335, 813-817 (2012).

4 Yang, L., Tan, X., Wang, Z. & Zhang, X. Supramolecular polymers: historical development, preparation, characterization, and functions. *Chem. Rev.* 115, 7196-7239 (2015).

5 Burnworth, M. et al. Optically healable supramolecular polymers. *Nature* 472, 334-337 (2011).

6 Yan, X., Wang, F, Zheng, B. & Huang, F. Stimuli-responsive supramolecular polymeric materials. *Chem. Soc. Rev.* 41, 6042-6065 (2012).

7 Appel, E. A., del Barrio, J., Loh, X. J. & Scherman, O. A. Supramolecular polymeric hydrogels. *Chem. Soc. Rev.* 41, 6195-6214 (2012).

8 Balkenende, D. W., Monnier, C. A., Fiore, G. L. & Weder, C. Optically responsive supramolecular polymer glasses. *Nat. Commun.* 7, 10995 (2016).

9 Filippidi, E. et al. Toughening elastomers using mussel-inspired iron-catechol complexes. *Science* 358, 502-505 (2017).

10 Nishimura, Y., Chung, J., Muradyan, H. & Guan, Z. Silyl ether as a robust and thermally stable dynamic covalent motif for malleable polymer design. *J. Am. Chem. Soc.* 139, 14881-14884 (2017).

11 Wang, Q. et al. High-water-content mouldable hydrogels by mixing clay and a dendritic molecular binder. *Nature* 463, 339-343 (2010).

12 Heinzmann, C., Weder, C. & de Espinosa, L. M. Supramolecular polymer adhesives: advanced materials inspired by nature. *Chem. Soc. Rev.* 45, 342-358 (2016).

13 Zhang, Y. et al. Malleable and recyclable poly(urea-urethane) thermosets bearing hindered urea bonds. *Adv. Mater.* 28, 7646-7651 (2016).

14 Cordier, P., Tournilhac, F., Soulie-Ziakovic, C. & Leibler, L. Self-healing and thermoreversible rubber from supramolecular assembly. *Nature* 451, 977-980 (2008).

15 Ying, H., Zhang, Y. & Cheng, J. Dynamic urea bond for the design of reversible and self-healing polymers. *Nat. Commun.* 5, 3218 (2014).

16 Cromwell, O. R., Chung, J. & Guan, Z. Malleable and self-healing covalent polymer networks through tunable dynamic boronic ester bonds. *J. Am. Chem. Soc.* 137, 6492-6495 (2015).

17 Li, C. H. et al. A highly stretchable autonomous self-healing elastomer. *Nat. Chem.* 8, 618-624 (2016).

18 Montarnal, D., Tournilhac, F. Hidalgo, M., Couturier, J. L. & Leibler, L. Versatile one-pot synthesis of supramolecular plastics and self-healing rubbers. *J. Am. Chem. Soc.* 131, 7966-7967 (2009).

19 Chen, Y., Kushner, A. M., Williams, G. A. & Guan, Z. Multiphase design of autonomic self-healing thermoplastic elastomers. *Nat. Chem.* 4, 467-472 (2012).

20 Korolkov, V. V. et al. Supramolecular heterostructures formed by sequential epitaxial deposition of two-dimensional hydrogen-bonded arrays. *Nat. Chem.*, doi:10.1038/nchem.2824 (2017).

21 Shi, Q. et al. Stimuli-controlled self-assembly of diverse tubular aggregates from one single small monomer. *Nat. Commun.* 8, 14943 (2017).

22 Krieg, E., Bastings, M. M., Besenius, P. & Rybtchinski, B. Supramolecular polymers in aqueous media. *Chem. Rev.* 116, 2414-2477 (2016).

23 Ahn, B. K., Lee, D. W., lsraelachvili, J. N. & Waite, J. H. Surface-initiated self-healing of polymers in aqueous media. *Nat. Mater.* 13, 867-872 (2014).

24 Burzio, L. A. & Waite, J. H. Cross-linking in adhesive quinoproteins: studies with model decapeptides. *Biochemistry* 39, 11147-11153 (2000).

25 Lee, H., Scherer, N. F. & Messersmith, P. B. Single-molecule mechanics of mussel adhesion. *Proc. Natl. Acad. Sci. U.S.A.* 103, 12999-13003 (2006).

26 Holten-Andersen, N. et al. pH-inducedmetal-ligand cross-links inspired by mussel yield self-healing polymer networks with near-covalent elasticmoduli. *Proc. Natl. Acad. Sci. U.S.A.* 108, 2651-2655 (2011).

27 Shafiq, Z. et al. Bioinspired underwater bonding and debonding on demand. *Angew. Chem. Int. Ed.* 51, 4332-4335 (2012).

28 Sedo, J., Saiz-Poseu, J Busque, F. & Ruiz-Molina, D. Catechol-based biomimetic functional materials. *Adv. Mater.* 25, 653-701 (2013).

29 Ky Hirschberg, J. H. K. et al. Helical self-assembled polymers from cooperative stacking of hydrogen-bonded pairs. *Nature* 407, 167-170 (2000).

30 Obert, E. et al. Both water- and organo-soluble supramolecular polymer stabilized by hydrogen-bonding and hydrophobic interactions. *J. Am. Chem. Soc.* 129, 15601-15605 (2007).

31 Kushner, A. M., Vossler, J. D., Williams, G. A. & Guan, Z. A biomimetic modular polymer with tough and adaptive properties. *J. Am. Chem. Soc.* 131, 8766-8768 (2009).

32 Phadke, A. et al. Rapid self-healing hydrogels. *Proc. Natl. Acad. Sci. U.S.A.* 109, 4383-4388 (2012).

33 Guo, M. et al. Tough stimuli-responsive supramolecular hydrogels with hydrogen-bonding network junctions. *J. Am. Chem. Soc.* 136, 6969-6977 (2014).

34 Sijbesma, R. P. et al. Reversible polymers formed from self-complementary monomers using quadruple hydrogen bonding. *Science* 278, 1601-1604 (1997).

35 Hentschel, J., Kushner, A. M., Ziller, J. & Guan, Z. B. Self-healing supramolecular block copolymers. *Angew. Chem. int. Ed.* 51, 10561-10565 (2012).

36 Zha, R. H., de Waal, B. F. M., Lutz, M., Teunissen, A. J. P. & Meijer, E. W. End groups of functionalized siloxane oligomers direct block-copolymeric or liquid-crystalline self-assembly behavior. *J. Am. Chem. Soc.* 138, 5693-5698 (2016).

37 Borland, P. & Rojkind, M. Negative staining with osmium tetroxide vapour. *Nature* 212, 84-85 (1966).

38 Genabeek, B. v. et al. Amplifying (im)perfection: the impact of crystallinity in discrete and disperse block co-oligomers. *J. Am. Chem. Soc.* 139, 14869-14872 (2017).

39 Dong, S. et al. Structural water as an essential comonomer in supramolecular polymerization. *Sci. Adv.* 3, eaao0900 (2017).

40 Ma, M., Guo, L., Anderson, D. G. & Langer, R. Bioinspired polymer composite actuator and generator driven by water gradients. *Science* 339, 186-189 (2013).

41 Lee, J. N., Park, C. & Whitesides, G. M. Solvent compatibility of poly(dimethylsiloxane)-based microfluidic devices. *Anal. Chem.* 75, 6544-6554 (2003).

42 Brunsveld, L., Vekemans, J., Hirschberg, J., Sijbesma, R. P. & Meijer, E. W. Hierarchical formation of helical supramolecular polymers via stacking of hydrogen-bonded pairs in water. *Proc. Natl. Acad. Sci. U.S.A.* 99, 4977-4982 (2002).

43 Lortie, F., Boileau, S. & Bouteiller, L. N,N'-disubstituted ureas: influence of substituents on the formation of supramolecular polymers. *Chem. Eur. J.* 9, 3008-3014 (2003).

44 Li, J., Viveros, J. A., Wrue, M. H. & Anthamatten, M. Shape-memory effects in polymer networks containing reversibly associating side-groups. *Adv. Mater.* 19, 2851-2855 (2007).

45 Zhang, G., Zhao, Q., Zou, W., Luo, Y. & Xie, T. Unusual aspects of supramolecular networks: plasticity to elasticity, ultrasoft shape memory, and dynamic mechanical properties. *Adv. Fund. Mater.* 26, 931-937 (2016).

46 Sollich, P. Rheological constitutive equation for a model of soft glassy materials. *Phys. Rev. E* 58, 738-759 (1998).

47. Barland, P. & Rojkind, M. Negative staining with osmium tetroxide vapour. *Nature* 212, 84-85 (1966).

48. Folmer, B. J. B., Sijbesma, R. P., Versteegen, R. M., van der Rijt, J. A. J. & Meijer, E. W. Supramolecular polymer materials: chain extension of telechelic polymers using a reactive hydrogen-bonding synthon. *Adv. Mater.* 12, 874-878 (2000).

The invention claimed is:

1. An intermediate compound of formula I,

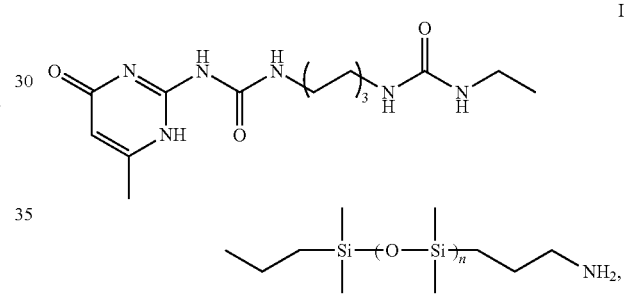

for use in manufacture of a self-healable, wherein n is from 4 to 24.

2. A method of making a compound as claimed in claim 1, comprising a step of reacting a compound of formula II

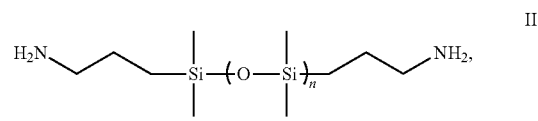

with a compound of formula III

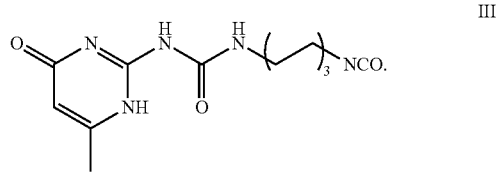

3. A self-healable material configured to self-heal in the presence of moisture or in aqueous condition environment after physical damages, comprising a compound of formula IV

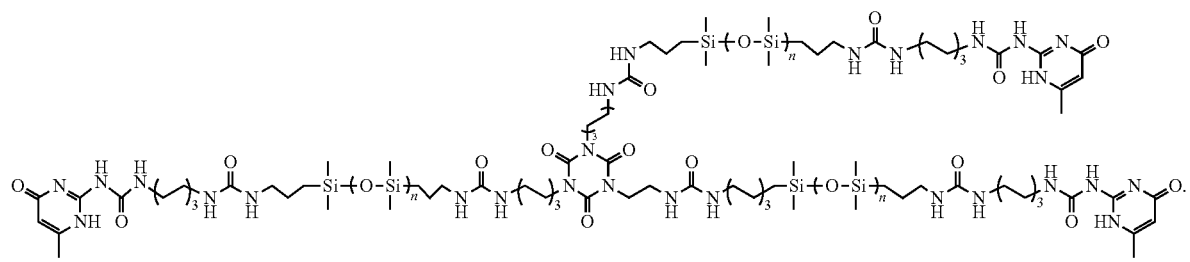
where n is 4 to 24.
4. A method of making of a self-healable material as claimed in claim 3, comprising a step of reacting a compound of formula I
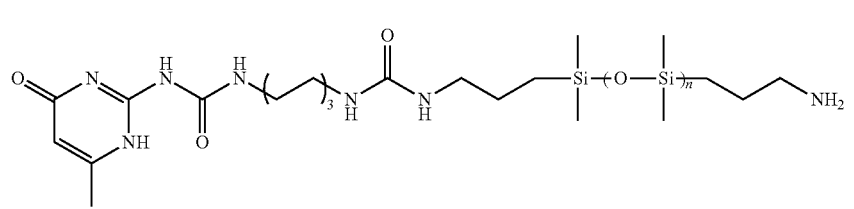
with a compound of formula V
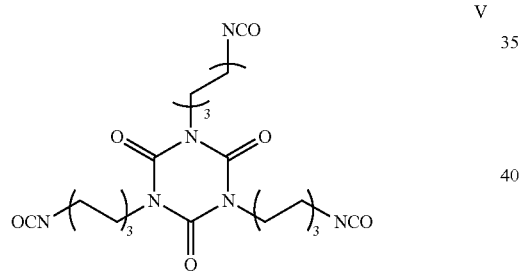
to form the compound of formula IV.
* * * * *